(12) United States Patent
Schroader et al.

(10) Patent No.: US 10,358,298 B2
(45) Date of Patent: Jul. 23, 2019

(54) SLIDE SORTER POP-UP DIVERTING CONVEYOR WITH TRANSFER RATE BASED ON ARTICLE CHARACTERISTICS

(71) Applicants: Steven Vann Schroader, Louisville, KY (US); Gus Nowotny, Goshen, KY (US)

(72) Inventors: Steven Vann Schroader, Louisville, KY (US); Gus Nowotny, Goshen, KY (US)

(73) Assignee: Fives Intralogistics Corp., Louisville, KY (US)

( * ) Notice: Subject to any disclaimer, the term of this patent is extended or adjusted under 35 U.S.C. 154(b) by 0 days.

(21) Appl. No.: 14/998,406

(22) Filed: Dec. 31, 2015

(65) Prior Publication Data

US 2016/0221766 A1    Aug. 4, 2016

Related U.S. Application Data

(60) Provisional application No. 62/124,736, filed on Dec. 31, 2014, provisional application No. 62/271,665, filed on Dec. 28, 2015.

(51) Int. Cl.
*B65G 47/54* (2006.01)
*B65G 43/08* (2006.01)
*B07C 3/08* (2006.01)
*B07C 5/08* (2006.01)

(52) U.S. Cl.
CPC .............. *B65G 47/54* (2013.01); *B07C 3/08* (2013.01); *B65G 43/08* (2013.01); *B07C 5/08* (2013.01)

(58) Field of Classification Search
CPC ................................ B65G 47/53; B65G 47/54
USPC ...... 198/358, 370.06, 370.1, 370.09, 457.02, 198/457.03, 809
See application file for complete search history.

(56) References Cited

U.S. PATENT DOCUMENTS

| | | | |
|---|---|---|---|
| 3,680,692 A * | 8/1972 | Southworth | B07C 5/10 198/367 |
| 4,044,897 A | 8/1977 | Maxted | |
| 4,798,275 A | 1/1989 | Leemkuil et al. | |
| 5,562,403 A | 10/1996 | Winski | |
| 5,868,238 A | 2/1999 | Bonnet | |
| 6,264,042 B1 | 7/2001 | Cossey et al. | |
| 6,370,447 B1 * | 4/2002 | Miyazaki | B65G 43/10 198/349.8 |
| 7,124,876 B2 | 10/2006 | Wolf | |
| 7,178,659 B2 | 2/2007 | Evans et al. | |
| 7,195,236 B2 | 3/2007 | Hillerich, Jr. et al. | |
| 7,240,781 B2 | 7/2007 | Ramaker et al. | |
| 7,243,777 B2 | 7/2007 | Reznik et al. | |
| 7,581,632 B2 | 9/2009 | Wallace et al. | |
| 7,982,156 B2 | 7/2011 | Burns et al. | |

(Continued)

*Primary Examiner* — William R Harp
(74) *Attorney, Agent, or Firm* — Carrithers Law Office, PLLC; David W. Carrithers

(57) ABSTRACT

This invention relates generally to a conveyor system including a speed control slide sorter system disposed perpendicular to a pass through conveyor wherein the speed control improves efficiency in loading and utilizing available area on the belt and selects the conveyor speed to induce a diverter action according to sensors which detect portions of the irregular shaped packages, parcels, and bags which can be engaged by the pop-up belt at a selected time to slow the conveyor and engage the pop-up transfer conveyor without stopping the conveyor.

43 Claims, 16 Drawing Sheets

(56) References Cited

U.S. PATENT DOCUMENTS

| | | | | |
|---|---|---|---|---|
| 8,060,243 B2* | 11/2011 | Ogawa | ................... | B65G 43/08 |
| | | | | 198/358 |
| 8,561,790 B2 | 10/2013 | Brayman et al. | | |
| 8,579,105 B2 | 11/2013 | Butler et al. | | |
| 9,376,268 B2* | 6/2016 | Schiavina | .............. | B65G 43/08 |
| 2003/0075416 A1* | 4/2003 | Prutu | ....................... | B07C 1/10 |
| | | | | 198/370.1 |
| 2006/0099065 A1 | 5/2006 | Neebe et al. | | |
| 2009/0145723 A1 | 6/2009 | Ogawa | | |
| 2010/0025309 A1 | 2/2010 | Burns et al. | | |
| 2011/0114444 A1 | 5/2011 | Butler et al. | | |
| 2011/0233031 A1 | 9/2011 | Brayman et al. | | |
| 2013/0220777 A1 | 9/2013 | Mauger et al. | | |
| 2013/0251482 A1 | 9/2013 | Issing | | |
| 2014/0364998 A1 | 12/2014 | Neiser et al. | | |

\* cited by examiner

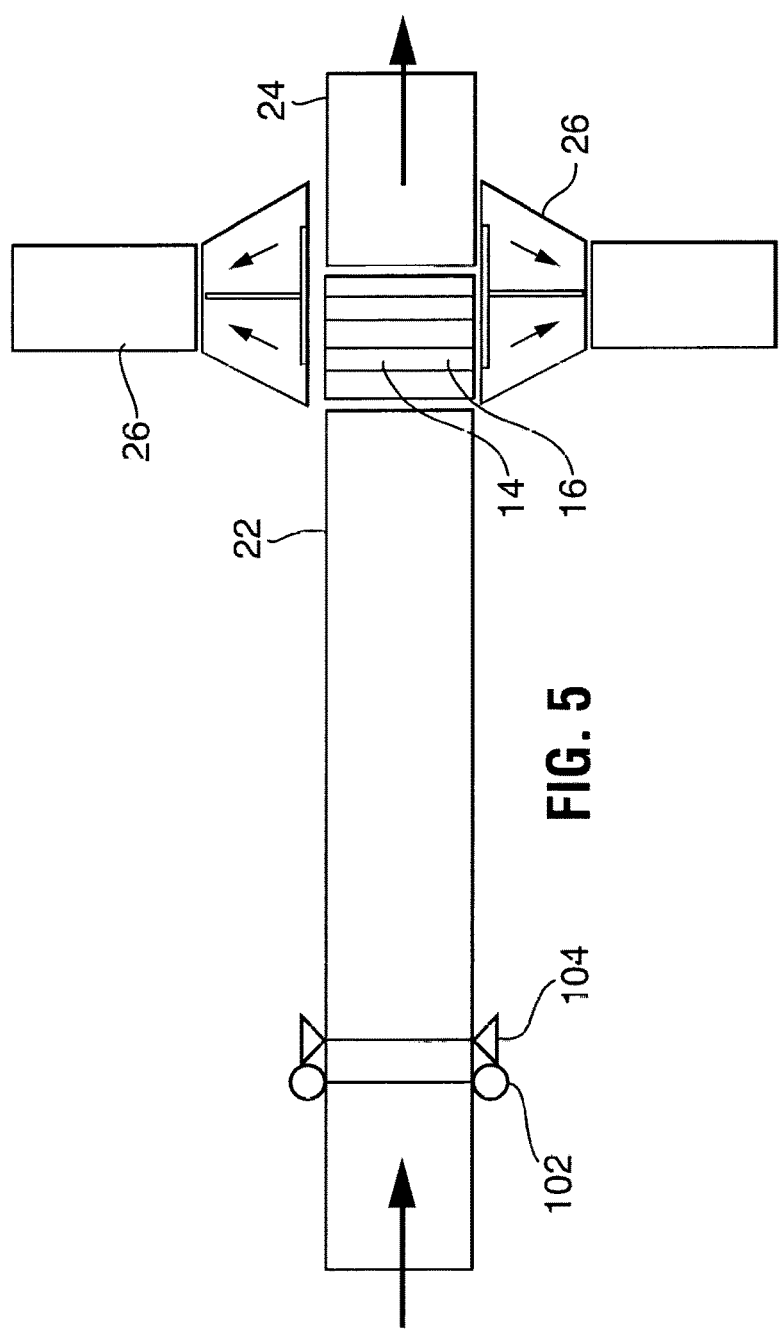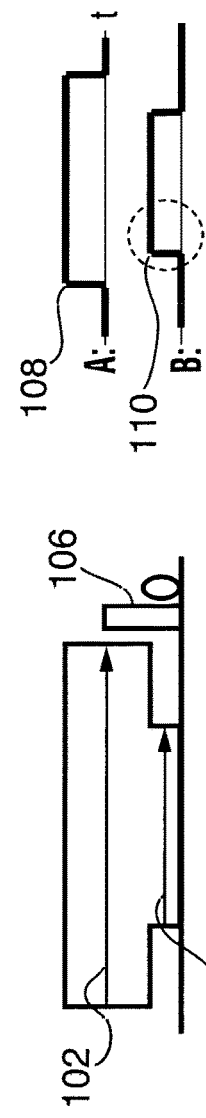

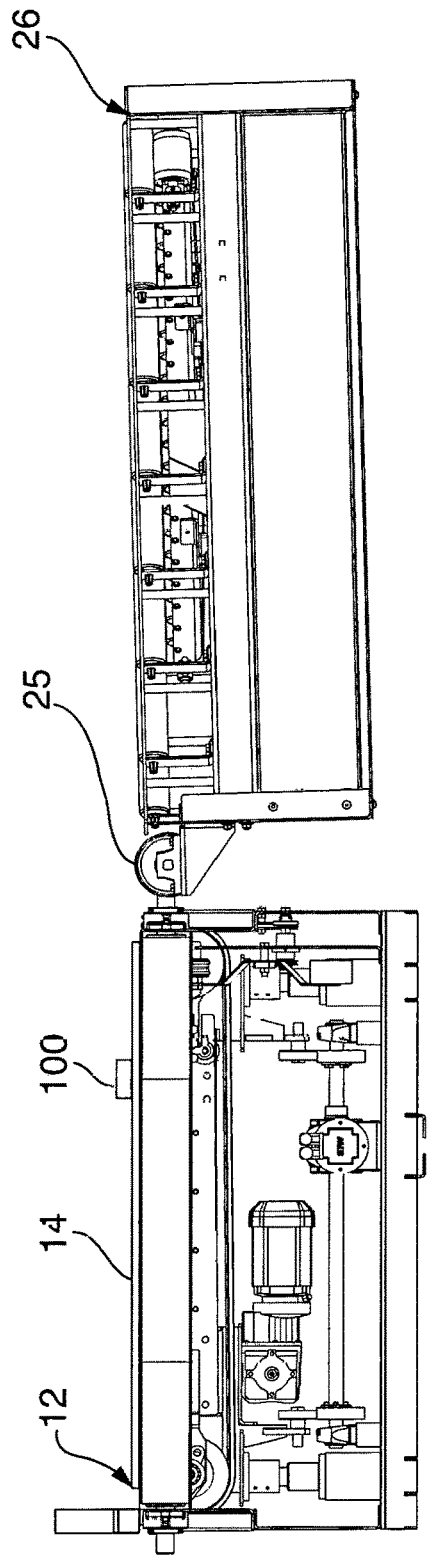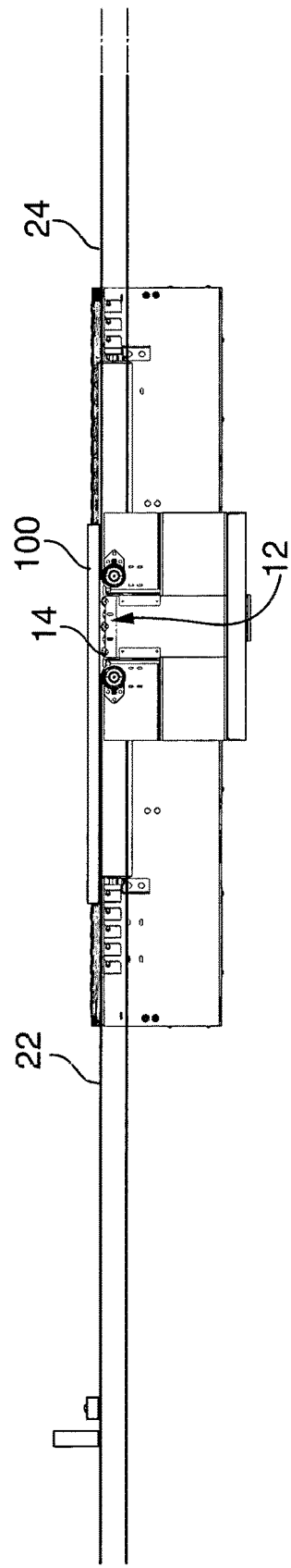
FIG. 20
FIG. 21

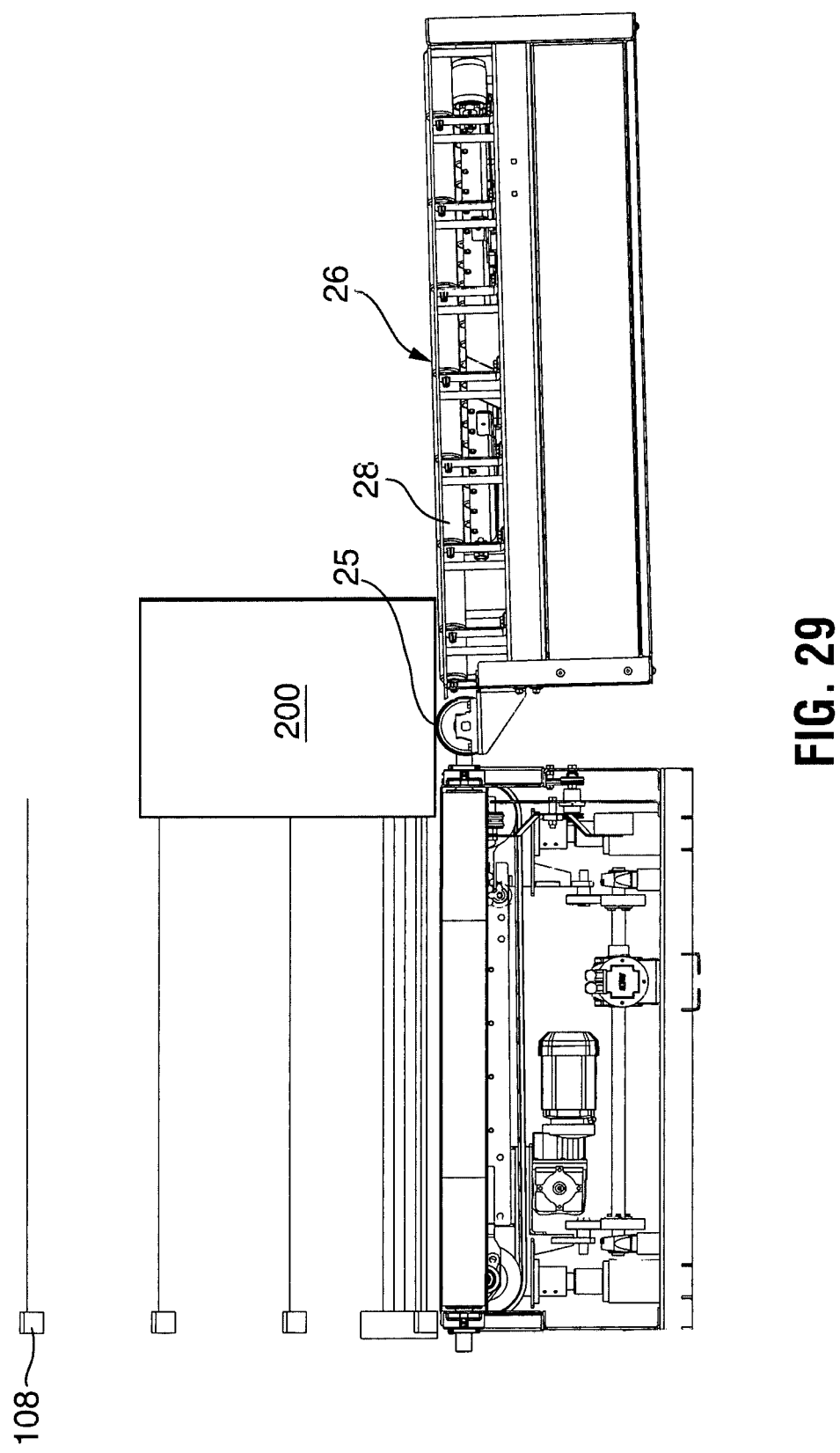

SLIDE SORTER POP-UP DIVERTING CONVEYOR WITH TRANSFER RATE BASED ON ARTICLE CHARACTERISTICS

CROSS REFERENCES TO RELATED APPLICATIONS

This application claims priority from U.S. Provisional Application Ser. No. 61/124,736 filed on Dec. 31, 2014 and U.S. Provisional Application Ser. No. 62/271,665 filed on Dec. 28, 2015 both of which are incorporated by reference herein in their entirety.

TECHNICAL FIELD OF THE INVENTION

The present invention relates to material handling and in particular to methods and apparatuses for conveying packages and a mechanism for sensing the location and physical characteristics of packages on a conveyor and controlling the transfer speed of the articles.

BACKGROUND OF THE INVENTION

Automated transfer systems are utilized by parcel delivery companies and airports to match in-coming packages with proper outgoing transport headed for the packages' destinations. The sorting equipment must be very fast, yet provide gentle and accurate handling of packages of various dimensions, shapes, and sizes.

Slide sorters utilize a pop-up conveyor or transfer mechanism to lift and carry selected articles, parcels, packages; bags to another conveyor oriented in a different direction and are often used in pallet handling, mail tray handling, or the like. With wooden pallets chains are often used as the conveying surface whereas with trays or boxes belts, rollers, wheels, and/or flexible material comprise the conveying surface. The pop-up conveyor is only activated upon its control system sensing by weight, photo cell, infrared, laser, or other electronic or radiation detecting device an article moving toward it from a feed conveyor. The pop-up conveyor than raises above the surface level of the on-coming conveyor as the article passes thereover, to lift the article or portion thereof and support same on a conveyor means to transfer the article to a different conveyor or other article removing device. The pop-up conveyor typically remains inactive until the sensors sense an article on the feed conveyor in on or in close proximity to the pop-up conveyor whereby the conveyor is activated raising and engaging a belt, roller, chain drive or combinations thereof to contact the bottom surface of the article and push it at a selected angle, usually 90 degrees off of the on-coming feed conveyor.

Meeting this goal is particularly difficult in the case of large or heavy irregular shaped packages. Belt and roller conveyor systems have often been used in package sorting systems to move packages from in-coming loading docks to outgoing transport. An initial sorting of packages traveling along a conveyor may be accomplished by diverting packages from the conveyor based on their destinations, or based on their size, weight or other characteristics.

Some conveyor systems include a main conveyor having a belt or multiple powered rollers or wheels fitted between the wheels below the normal conveyor surface. U.S. Pat. No. 3,926,298 shows a conveyor assembly wherein a section of the drive rollers can be lowered to drop a parcel onto the belt conveyor, without interrupting the speed of articles moving along the primary path. However, the belt conveyor can divert in only one direction.

U.S. Pat. No. 5,547,084 shows a luggage sorting system in which bags are fed onto a moving carriage that includes multiple conveyors. After loading, the carriage moves along a track until it aligns with output conveyors. Then the carriage conveyors shift the bags from the carriage to appropriate output conveyors. This is not a high speed sorting system because the bags must come to rest on the carriage and be transported laterally, and then accelerated again after sorting.

There is a need in the art for a diverter that can reliably divert irregular shaped packages from a main conveyor path, using a slide sorter mechanism that is modular and easy to repair, all while operating at a high speed of throughput along the main path.

Conventional pop-up transfer conveyors require that the on-coming conveyor belt stop as the article passes over the pop-up transfer conveyor in order that the belts of the pop of conveyor can be raised and activated to transfer the article onto a receiving or diverging conveyor with the article maintained in a proper orientation for conveyance on the receiving conveyor. A problem occurs when the oncoming conveyor does not stop with the article over the pop-up conveyor, in that longitudinal articles are rotated sideways in the transfer procedure which causes downstream orientation problems with the receiving conveyor.

SUMMARY OF THE INVENTION

The instant invention includes a plurality of sensors set to detect and activate the pop-up conveyor for articles of a selected size, weight, density, or other physical characteristic to separate and orient the articles for further separation. Moreover, the sensors can be set to allow articles having selected characteristics such as an envelope, or square box or package to proceed through and over the pop-up conveyor to the out-going through conveyor.

The slide sorter conveyor speed control system includes a first upstream conveyor conveying a first group of articles of a selected size, shape, irregular base, marking, or other characteristic and a second group of articles of a selected different size, shape of characteristic along a longitudinal axis of the first upstream conveyor. A second downstream conveyor conveying the first group of articles along a longitudinal axis of the second downstream conveyor. A pop-up or slide sorter conveyor is disposed between and in flow communication with the first upstream conveyor which passes through the first group of articles. The pop-up conveyor diverts and conveys the second group of articles in a direction away from the second downstream conveyor. The pop-up conveyor includes a frame including a plurality of spaced apart parallel conveyor rollers disposed normal to and at about the same height as the first upstream conveyor and the second downstream conveyor for receiving and conveying and passing through the first group of articles from the first upstream conveyor to the second downstream conveyor. A motor and drive means for rotating the conveyor rollers. At least one pop-up belt disposed between the spaced apart conveyor rollers, the pop-up belt is spaced apart from and in parallel alignment with the conveyor rollers which include a motor and drive means for rotating the one pop-up belt. The pop-up belt rests a selected distance below the conveyor rollers in an inactive position during conveying the first group of articles from the first upstream conveyor passing over and through the conveyor rollers of the pop-up conveyor to the second downstream conveyor. The pop-up conveyor includes cam means for raising the pop-up belt a selected distance above the conveyor rollers conveying and diverting the second group of articles from the second downstream conveyor. At least one multiplex light screen sensor detecting a full length of the first group of articles and the second group of articles. At least one photocell includes a transmitter projecting at least a single beam a selected distance over a surface of the first upstream conveyor. A receiver for receiving the at least a single beam detects portions of articles of the first group of articles resting on a surface of the first upstream conveyor surface and detects portions of articles of the second group of articles resting on a surface of the first upstream conveyor surface engageable by the at least one pop-up belt. Variable speed control means is used for controlling a conveying speed of the first upstream conveyor. Computer control means is in electrical communication with the variable speed control means and the pop-up conveyor motor and the first upstream conveyor for controlling actuation of the at least one pop-up belt of the pop-up conveyor in response to data transmitted from the multiplex light screen sensor and the photocell allowing the first group of articles to pass over the conveyor rollers and through the pop-up conveyor to the second downstream conveyor. The computer activates the cam means raising the at least one pop-up belt diverting the second group of articles away from the second downstream conveyor without stopping the first upstream conveyor and the second downstream conveyor. The computer receives input from the multiplex light screen sensor and controls the optimal speed of the first up-stream conveyor based upon the full length of the article and the portions of the article resting on the surface of the first up-stream conveyor slowing the first up-stream conveyor and activating the pop-up conveyor raising the belt to engage the portion of the article to be diverted. The computer controls the duration the pop-up belt remains activated based on the full length of the article to be diverted. The computer controls the speed of the first upstream conveyor and slows the speed of the first upstream conveyor prior to the article engaging the pop-up conveyor which is determined as a function of the length of the item or the length of a first portion of the article falling within a selected proximity to the pop-up conveyor.

The photoelectric sensor, or photo eye, is a device used to detect the distance; absence, or presence of an object by using a light transmitter, often infrared, and a photoelectric receiver. There are three different functional types: opposed (through beam), retro-reflective, and proximity-sensing (diffused). A through-beam arrangement consists of a receiver located within the line-of-sight of the transmitter. In this mode, an object is detected when the light beam is blocked from getting to the receiver from the transmitter. A reflective arrangement places the transmitter and receiver at the same location and uses a reflector to bounce the light beam back from the transmitter to the receiver. An object is sensed when the beam is interrupted and fails to reach the receiver. A proximity-sensing (diffused) arrangement is one in which the transmitted radiation must reflect off the object in order to reach the receiver. In this mode, an object is detected when the receiver sees the transmitted source rather than when it fails to see it. As in retro-reflective sensors, diffuse sensor emitters and receivers ale located in the same housing. But the target acts as the reflector, so that detection of light is reflected off the disturbance object. The emitter sends out a beam of light (most often a pulsed infrared, visible red, or laser) that diffuses in all directions, filling a detection area. The target then enters the area and deflects part of the beam back to the receiver. Detection occurs and output is turned on or off when sufficient light falls on the receiver. The detecting range of a photoelectric sensor is its "field of view", or the maximum distance from which the sensor can retrieve information, minus the minimum distance. A minimum detectable object is the smallest object the sensor can detect. More accurate sensors can often have minimum detectable objects of minuscule size.

The speed control slide sorter system disposed perpendicular to a pass through conveyor wherein the speed control improves efficiency in loading and utilizing available area on the belt and selects the conveyor speed to induce a diverter action according to sensors which detect portions of the irregular shaped packages, parcels, and bags which can be engaged by the pop-up belt at a selected time to slow the conveyor and engage the pop-up transfer conveyor without stopping the conveyor.

The conveyor sorting assembly includes a pop-up belt slide sorter moving transversely to the conveyor direction to place in the path of articles moving along a conveyor via a pass-through conveyor or a diverting conveyor. The slide sorter is mounted on a reversible belt drive and preferably has at least one diverting or receiving conveyor disposed in flow communication with the pass-through conveyor. The slide sorter speed control unit can include a variable speed motor and transfer rate or a multi-speed system so that items passing though the on-coming conveyor belt slows to a pre-selected slower or higher speed depending upon the physical characteristics of the package such as the size and shape of the package at a predetermined area of the conveyor. Large and/or irregular shaped packages can be sorted at high speed and diverted to a selected conveyor providing denser loading of conveyors and better utilization of space on the conveyor. Smaller envelopes and packages can be allowed to pass through based on their weight or density or other physical characteristics. The slide sorter speed control improves efficiency in loading and utilizing available area on the belt and selects the conveyor speed to induce a diverter action according to sensors which detect portions of the irregular shaped packages, parcels, and bags which can be engaged by the pop-up belt. The speed control slide sorter system is disposed perpendicular to a pass through conveyor. Wherein the speed control improves efficiency in loading and utilizing available area on the belt by selecting the conveyor speed to induce a diverter action according to sensors which detect portions of the irregular shaped packages, parcels, and bags which can be engaged by the pop-up belt.

The sensors provide input to a programmable logic control device, "PLC" which is a digital computer used for automation of industrial electromechanical processes, such as control of machinery on factory assembly lines. PLCs are used in many machines, in many industries. PLCs are designed for multiple arrangements of digital and analog inputs and outputs, extended temperature ranges, immunity to electrical noise, and resistance to vibration and impact. Programs to control machine operation are typically stored in battery-backed-up or non-volatile memory. A PLC is an example of a "hard" real-time system since output results must be produced in response to input conditions within a limited time, otherwise unintended operation will result.

Items can be diverted without stopping the conveyor and bringing the item to rest prior to diverting the item with the pop-up slide sorter and the items are not brought to rest over the pop-up prior to it rising. The speed of the conveyor is reduced or increased prior to the pop-up transfer of an irregular shaped package as a function of the length of the item or the length of the first portion falling within close proximity to the conveying surface close enough that the pop-up belts can be expected to engage and impart a transverse force to discharge the item. Sensors detect areas of the item resting on the conveyor to effect cooperative engagement with the pop-up conveyor.

The slide sorter conveyor speed control system, comprises a first on-coming flow through conveyor positioned to carry articles in the direction of a longitudinal axis of said conveyor. A slide sorter pop-up conveyor is positioned normal to or across the longitudinal axis transverse to and slightly below the surface of the conveyor. It includes a transport mechanism being operative to move the pop-up conveyor between a home position in which the out-going flow through conveyor receives articles from the on-coming pass through conveyor and transfers them along the direction of said longitudinal axis. A diverting conveyor or receiving conveyor is position on either side or both sides of the flow through conveyors and receives items transferred by the pop-up conveyor moving them away from the direction of the longitudinal axis. A multiplexed light screen is used to detect the full length of items. A photocell or photo eye affixed over the on-coming conveyor surface detects portions of the irregular item that can be engaged by the pop-up conveyor. Computer control means or the PLC is provided for controlling actuation of said pop-up conveyor in response to data transmitted from the multiplexed light screen and the photocells an and array of height sensors which slow the on-coming conveyor down just prior to tall articles contacting the op-up conveyor to prevent tip-over of top heavy items.

It is an object of the present invention to provide a conveyor pop-up slide sorter mechanism and speed sensing control system wherein items can be diverted without stopping the conveyor and bringing the item to rest prior to diverting the item with the pop-up slide sorter and the items are not brought to rest over the pop-up prior to it rising.

It is object of the present invention to control the speed of the conveyor decreasing the conveyor speed prior to the pop-up transfer as a function of the length of the item or the length of the first portion falling within close proximity to the conveying surface close enough that the pop-up belts can be expected to engage and impart a transverse force to discharge the item.

It is object of the present invention to provide sensors to detect areas of the item resting on the conveyor to effect cooperative engagement with the pop-up conveyor.

It is an object of the present invention to provide a slide sorter speed control system having variable and/or multiple speed capabilities.

It is an object of the present invention to provide a slide sorter speed control system having at least three speeds including a feed belt slowing to either 100 or 200 from 300 feet per minute or to remain at 300 feet per minute prior to making a divert action.

It is an object of the present invention to provide a different raising point "encoder pulse" for each speed and a slow down point "encoder pulse" from and induct eye.

It is an object of the present invention to incorporate a computer control system to measure and apply the fastest speed that a variety of items can be handled such as a bumper, chain saw, table, tire, bucket, and 2×4 board of varying lengths to collect a range of flat bottom speed criteria.

It is an object of the present invention to a use a photo eye just above the belt surface to detect anything within about ⅜ inch above the belt.

It is an object of the present invention to provide a maximum safe speed calculated by the item length measured with the photo eye if flat or a first contact "pd" length measured with the photo eye.

It is an object of the present invention wherein speed length is measured with the photo eye.

It is an object of the present invention to determine a hit point or raise and a slowdown point from a lookup table.

It is another object of the present invention for the on-coming conveyor, the out-going conveyor, the pop-up slide sorter conveyor, take-off roll, and receiver or diverter conveyor to have variable rates of speed.

It is an object of the present invention to develop a pop-up timed to raise when the front of an item crosses the first lift rail.

It is another object of the present invention to provide at least a three speed adjustment wherein the hit point is 131 at 300 feet per minute and slow down is 120, the hit point is 134 at 200 feet per minute and a slow down is 125, and a hit point of 139 at 100 feet per minute and a slow down of 126.

It is an object of the present invention to provide a pop-up belt having a speed of at least two meters/second (394 fpm), activated upon raising.

It is an object of the present invention wherein the lift mechanism stays up based on item lift length measured with the second photo eye, plus a length adder using a feed belt encoder (length added approx 30 inches).

It is an object of the present invention to provide acceleration and deceleration rates on slowdown and speed of about 0.3G's.

It is an object of the present invention to provide a selected minimum gap.

It is an object of the present invention to include an array of height sensors to detect tall top heavy items to control conveyor to obtain a maximum safe speed to prevent tip over during the slide sorter transfer.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 5 shows a flow through conveyor having a slide sorter with a pop-up belt in flow communication with a pair of opposing 90 degree take away output lanes, and sensor inputs including a multiplexed light screen sensor to detect the length of items and photocell (single beam) sensor to detect portions of the item that can be engaged by the pop-up belt;

FIG. 6 is an example of a sensor input for an item with an irregular base showing the height of the light sensor and photocell;

FIG. 7 is an example of a sensor input for a foot print of an item with an irregular base;

FIG. 20 is a sectional end view of the pop-up transfer conveyor speed control assembly showing the in-coming conveyor and the multiplexed light screen sensor and photocell or photo eye, and the longitudinal article resting on the belts of the pop-up transfer conveyor in the raised position, even with the take-off roller and above the diverter or receiver conveyor and the outgoing flow through conveyor;

FIG. 21 is a side view of the pop-up transfer conveyor speed control assembly showing the in-coming conveyor and the multiplexed light screen sensor and photocell or photo eye, and a portion of the longitudinal article resting on the pop-up transfer conveyor in the raised position at the same elevation as the take-off roller and above the leading edge of the diverter or receiver conveyor, and the outgoing flow through diverter conveyor.

FIG. 29 is a sectional end view of the pop-up transfer conveyor speed control assembly showing the in-coming conveyor and the multiplexed light screen sensor and photocell or photo eye, and the drum resting on the belts of the pop-up transfer conveyor, the take-off conveyor, and a portion of the receiver conveyor rollers all in horizontal alignment level with one another;

DETAILED DESCRIPTION OF THE PREFERRED EMBODIMENT

As shown in the FIGS. 1-29, a slide sorter pop-up diverting conveyor and speed control system 10 has a transfer rate based on article characteristics.

Figure 1:
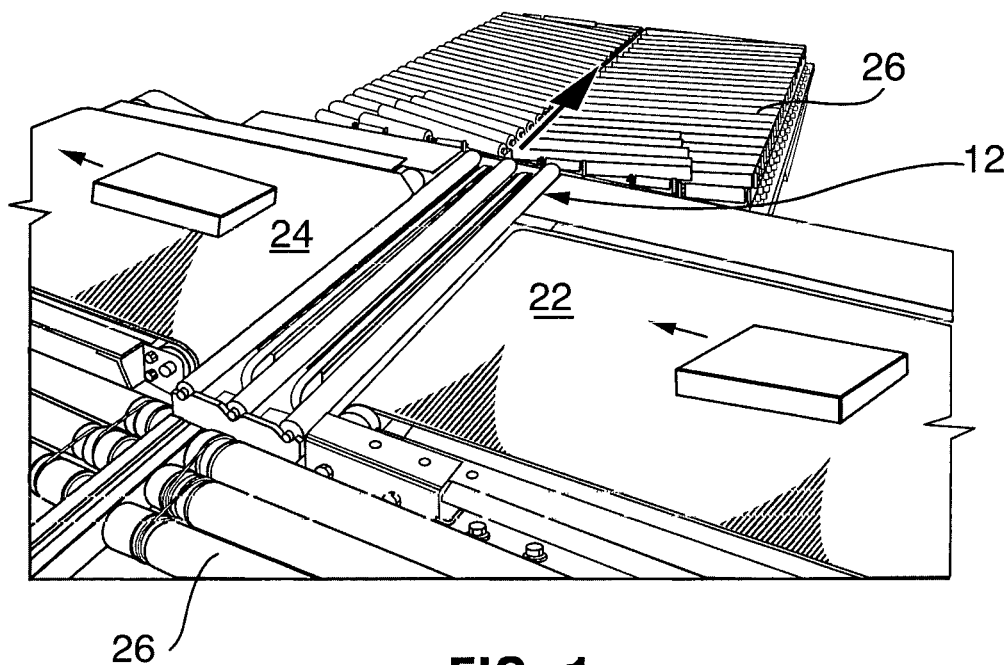
FIG. 1 shows a prior art embodiment with an in-coming flow-through conveyor with a slide sorter pop-up belt disposed at a 90 degree angle below the in-coming flow-through conveyor surface and a diverter conveyor in flow communication with and adjacent to the slide sorter.
Figure 2:
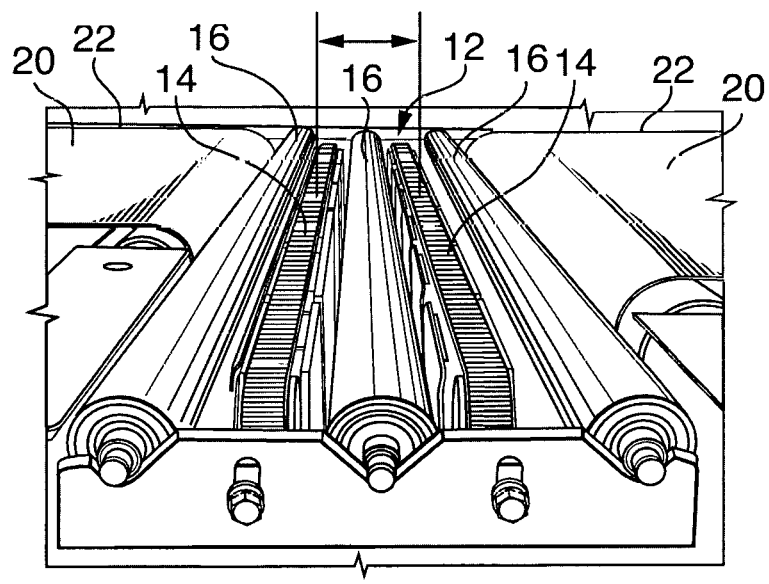
FIG. 2 is an enlarged view of a prior art slide sorter pop-up belt section showing belts disposed between conveyor rollers which convey flow through items to a take-off conveyor downstream of the slide sorter.

As shown in FIGS. 1-2 conventional (prior art) slide sorter or pop-up conveyors 12 include at least one and typically a plurality of parallel belts 14 space apart and disposed between a selected number of parallel pop-up conveyor rollers 16. Pop-up belt spacing is typically around 4 to 12 inches, but can be any selected width. A single belt or multiple belts 14 can be employed together. The belts 14 can be raised and lowered above or below the surface of the pop-up conveyor 12 by various lift means such as a cam means 18. In one preferred embodiment, the belts 4 are about ¼ inch below the surface 20 of the in-coming conveyor 22 and out-going conveyor 24 when at rest in the inactive position. The belts 4 are raise to about one-half to 2 and three quarters of an inch (½-¾) above the in-coming conveyor 22 and out-going conveyor 24 to discharge items.

The pop-up belt slide sorter 12 moves transversely over a flow-through conveyor 22, 24. Items which are redirected via the pop-up conveyor 12 conveyed over an optional take-off roller mounted parallel and between the flow-through conveyor 22, 24 and diverting conveyor 26. The slide sorter 12 is mounted on a reversible belt drive and preferably has at least one diverting conveyor 26 disposed in flow communication with the pass-through conveyors 22, 24. Only items destined for the diverter or receiver conveyor 26 are discharged via the pop-up conveyor 12. Other items based on their size or physical characteristics can pass straight though the slide sorter 12.

Figure 3:
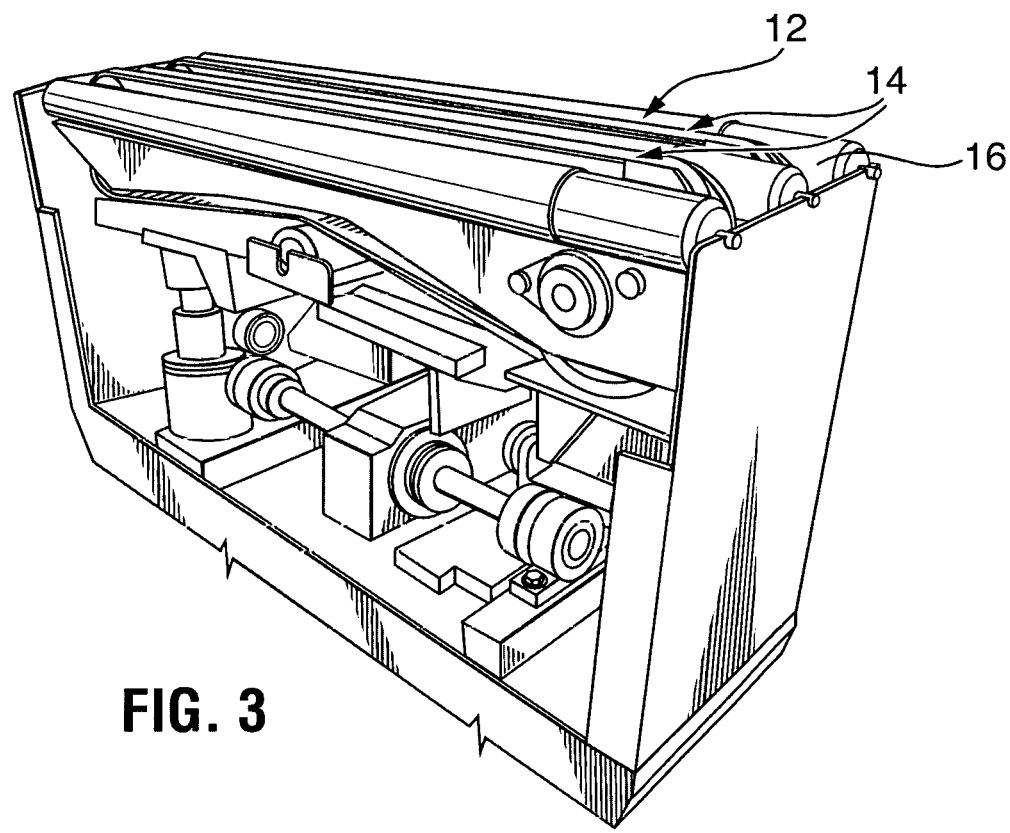
FIG. 3 shows proxi switches to provide feedback to the PLC regarding the position of the rollers of the slide sorter.
Figure 4:
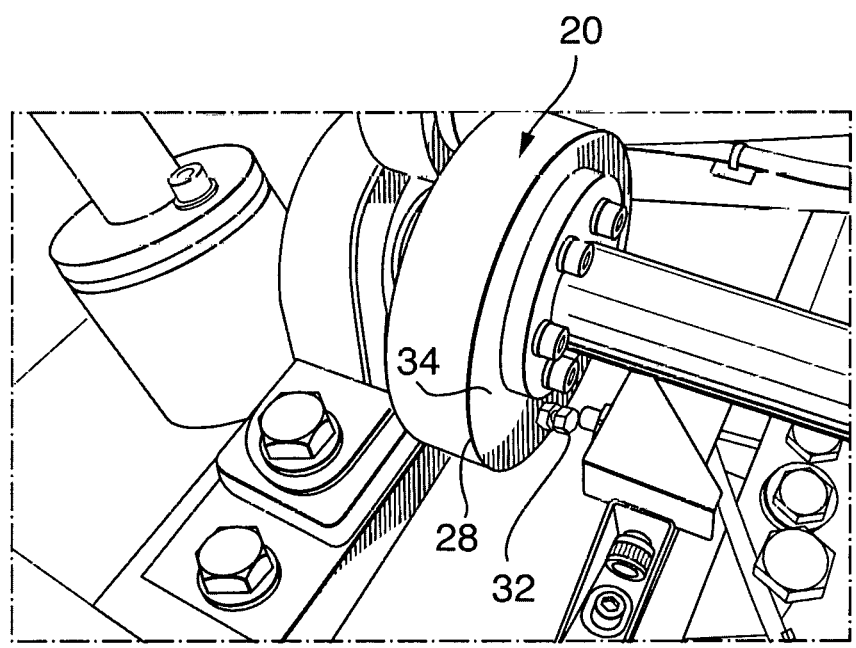
FIG. 4 shows the proximity sensor for detecting the home down position on the cam used to raise the pop-up belt between the conveyor rollers of the slide sorter.

The cam means 18 used to raise the pop-up mechanism is shown in FIGS. 3 and 4 in the down position with a lobe 28 at the bottom. The proximity sensor 30 detects a screw 32 on the cam disc 34 indicating the home/down position, (i.e. not discharging). Proximity switches, for example three switches, detect the presence and position of the pop-up roller 16. In case of jam, the roller 16 is raised and the proximity gives to the programmable logic control, "PLC", indication and the PLC stops the conveyor for maintenance.

The speed control slide sorter system 10 is disposed perpendicular to the pas through conveyor wherein the speed control improves efficiency in loading and utilizing available area on the belts 22, 24 by selecting the conveyor speed to induce a diverter action according to sensors 102 on the slide sorter speed control unit which detect portions of the irregular shaped packages, parcels, and bags which can be engaged by the pop-up belts 14.

The pop-up belt slide sorter 12 moves transversely to the flow through conveyors 22, 24 in the path of articles moving along the pass through conveyors 22, 24. The slide sorter assembly 12 is mounted on a reversible belt drive and preferably has at least one diverting conveyor 26 disposed in flow communication with the pass-through conveyor 12.

A novel feature of the present invention is the apparatus and method for transverse transfer of items which are not brought to rest over the slide sorter pop-up conveyor 12 prior to the conveyor rising above the in-coming flow through conveyor 22 and out-going flow through conveyor 24 which continues to move in a forward direction before and during the pop-up conveyor 12 transfer of the item to the diverter conveyor 26 or to the take-off roll 25 disposed between the slide sorter 12 and diverter conveyor 26. The in-coming conveyor 22 merely slows down. Another novel feature of the present invention are the steps of creating and using an algorithm to reduce the speed of the in-coming conveyor 22 prior to the pop-up transfer as a function of the length of the item or the length of a selected portion of the item, such as the first portion, falling within close proximity to the conveying surface at a selected effective height, for instance ½ inch, which is close enough that the belts 14 of the slide sorter 12 engage and impart a transverse force to discharge the item.

The slide sorter speed control system comprises a three speed unit wherein the in-coming pass though conveyor belt 22 slows to a selected slower or higher speed depending upon the size and shape of the package at a predetermined area of the conveyor. Large and/or irregular shaped packages can be sorted at high speed and diverted to a selected conveyor 26 providing denser loading of conveyors and better utilization of space on the conveyor. The slide sorter speed control improves efficiency in loading and utilizing available area on the belts 22, 24 and selects the conveyor speed to induce a diverter action according to sensors 102 which detect portions of the irregular shaped packages, parcels, and bags which can be engaged by the pop-up belt 14. Items can be diverted without stopping the in-coming flow through conveyor 22 and bringing the item to rest prior to diverting the item with the pop-up slide sorter 12 and the items are not brought to rest over the pop-up conveyor 12 prior to it rising. The speed of the in-coming conveyor 22 is reduced prior to the pop-up transfer as a function of the length of the item or the length of the first portion falling within close proximity to the conveying surface close enough that the pop-up belts 14 can be expected to engage and impart a transverse force to discharge the item. Sensors 102 detect areas or a foot print of the item resting on the conveyor to effect cooperative engagement with the pop-up conveyor 12.

Figure 8:
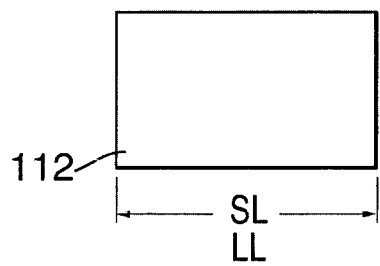
FIG. 8 shows a footprint of an article on the on-coming conveyor measured to determine speed length by the second photo eye to provide a value which can be converted by the encoder resolution to determine the maximum safe speed to approach the slide sorter.
Figure 9:
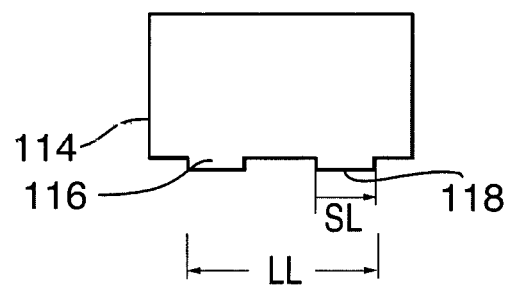
FIG. 9 shows a pair of footprints of an irregularly shaped article on the on-doming conveyor measured to determine speed length by the second photo eye to provide a value which can be converted by the encoder resolution to determine the maximum safe speed to approach the slide sorter.
Figure 10:
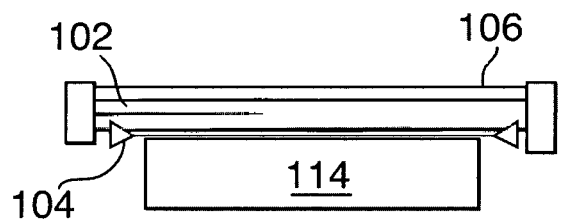
FIG. 10 is an cross section view of the in-coming flow-thorough conveyor showing the position of the first photo eye and second photo eye.

The multiplexed light screen sensor 102 detects the full length of items as shown in FIG. 5 depicting a flow through conveyor 22, 24 having a 90 degree takeaway output or diverted conveyor 26 on both sides. The photocell (single beam) 104 is positioned to detect objects approximately 3/8" over the belt including portions of the item that can be engaged by pop-up belts 14. As further shown in FIGS. 6-13, the in-coming conveyor 22 is in flow communication with a slide sorter 12 with a pop-up belts 14 and a pair of opposing 90 degree take away output lanes of a diverter conveyor 26. Sensor inputs including a multiplexed light screen sensor 102 projecting at least one beam across the belt 22 to detect the length of items and at least one photocell (single beam) sensor 104 about 3/8 of an inch over the belt 22 projecting a beam across the belt 22 to detect portions of the item near or touching the surface 20 of the in-coming flow through conveyor that can be engaged by the pop-up belt 12 as depicted in FIGS. 5-7. As shown in FIG. 6, a sensor input is shown for an item 106 with an irregular base detected by photocell 104 and the height detected with the light sensor 102. FIG. 7 depicts the a sensor input for a foot print of an item with a regular base 108 and with an irregular base 110;

FIG. 8 shows an article footprint 112 of an article on the on-coming conveyor 22 measured to determine speed length by a first photo eye 104 and a second photo eye 106 to provide a value which can be converted by the encoder resolution to determine the maximum safe speed to approach the slide sorter. FIG. 9 shows a pair of footprints 116, 118, of an irregularly shaped article 114 on the on-coming conveyor 22 measured to determine speed length by the second photo eye 106 to provide a value which can be converted by the encoder resolution to determine the maximum safe speed to approach the slide sorter.

A novel feature of the slide sorter is the variable speed control system. A preferred embodiment of the present invention provides variable speed rates and a selection of at least three speed adjustments. The pop-up belt 14 has a speed of at least two meters/second (394 fpm) which is activated upon raising. The slide sorter 12 lift mechanism stays up based on item lift length measured with the second photo eye 106, plus a length adder using a feed belt encoder (length added approx 30 inches). A minimum gap is specified between articles, such as for example 36 inches.

The speed control method comprises or consists of the steps of activating the first photoelectric eye 104 detects the article moving on the conveyor. The second photoelectric eye or sensor 106 is positioned just above the conveyor belt and detects anything extending above a predetermined height such as within 3/8 inch of the belt. The maximum safe speed for the transfer of an article from the conveyor feed belt or in-coming flow through conveyor 22 to the pop-up conveyor 12 is calculated using either the item lift length (LL) which is equal to the pad length (SL) as shown in FIGS. 8-9 as measured with the second photoelectric eye 106 if flat, or the first contact pad length (SL) measured with the second photoelectric eye 106. The maximum safe speed (FPM)=5×SL+100, where SL is he length in inches (converted for the encoder resolution and empirical test data). The resulting value is rounded down to a selected increment such as 100, 200, or 300 feet per minute (fpm). The speed length is measured by the second photo eye 106. The hit point (raise point) is then determined. The slowdown point is determined for raising the slide sorter pop-up conveyor 12 when the front of the item crosses the first lift rail. For instance, where the hit point is 131 at 300 feet per minute the slow down is 120; when the hit point is 134 at 200 feet per minute the slow down is 125, and when a hit point is 139 at 100 feet per minute the slow down of 126.

Figure 11:
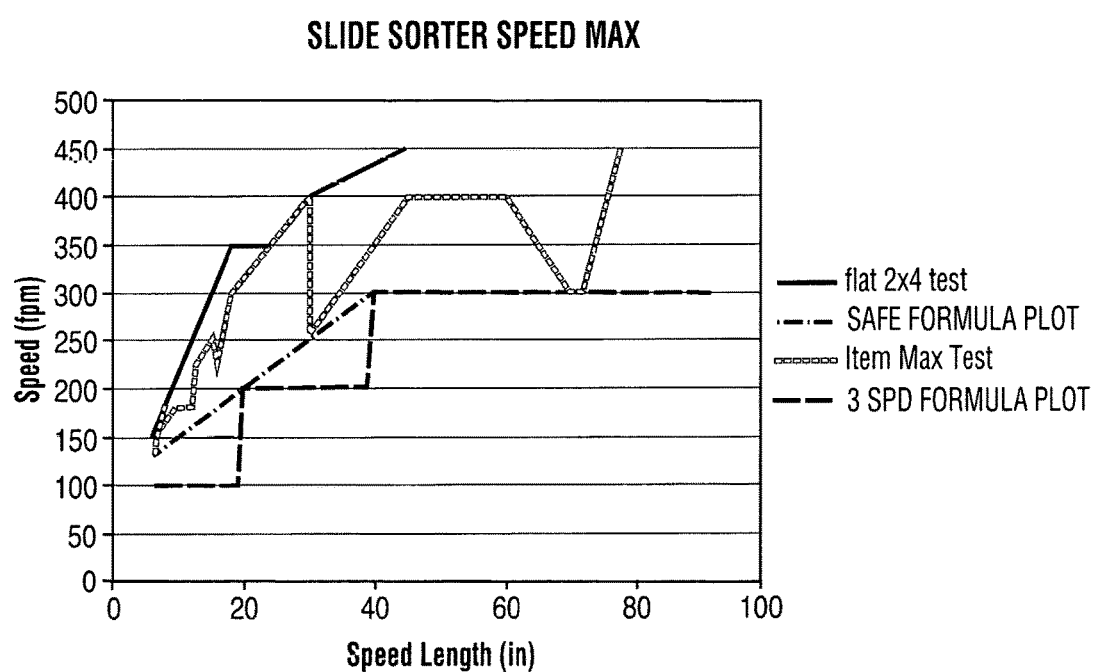
FIG. 11 shows a graph of the Slide Sorter Speed Maximum flow rate based on speed vs speed length.
Figure 12:
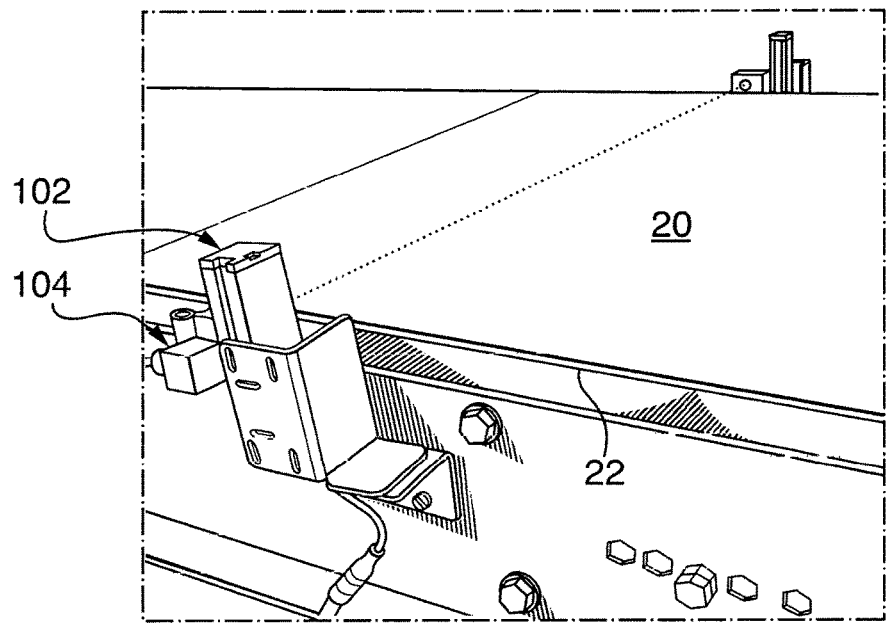
FIG. 12 is an enlarged view of a multiplexed light screen and photocell disposed on a and portions of an item that can be engaged by pop-up belts.

FIG. 11 shows a graph of speed vs. speed length showing the Slide Sorter Safe Speed Maximum for a selected type of article.

The pop-up speed control=2 m/s (394 fpm), activated upon raising. The lift mechanism stays up based on the item lift length (LL) measured with the second photoelectric eye, plus a length adder using the feed belt encoder where (length adder is approx 30 inches). The acceleration and deceleration rate on slowdown and speed=0.3G's.

An example providing a minimum gap distance of 36 inches the travel distance calculations are as follows:

| vi (fpm) | vf (fpm) | vi (in/s) | vf (in/s) | accel g's | a (in/s$^2$) | $Vf^2 = Vi^2 + 2as$ $s = (Vf^2 - Vi^2)/2a$ dist (in) |
|---|---|---|---|---|---|---|
| 300 | 200 | 60 | 40 | 0.3 | 115.8 | 8.6 |
| 300 | 100 | 60 | 20 | 0.3 | 115.8 | 13.8 |
| 100 | 300 | 20 | 60 | 0.3 | 115.8 | 13.8 |
| 200 | 300 | 40 | 60 | 0.3 | 115.8 | 8.6 |

If an article is to be speeded up from 100 fpm to 300 fpm, then slowed down to 100 fpm to sort again, a trailing edge of the previous 13.8 inches acceleration plus 13.8 inches deceleration plus 6 inches of lift belt spacing ahead of the item to be sorted or 33.6 inches belt feed (B-F) using 0.3G's.

The sensors 102, 104, 106 provide input to control the speed of the in-coming flow through conveyor 22 using a PLC for decreasing the conveyor 22 speed prior to the pop-up conveyor 12 transfer as a function of the length of the item or the length of the first portion falling within close proximity to the conveying surface close enough that the pop-up belts can be expected to engage and impart a transverse force to discharge the item. The sensors detect areas of the item resting on the conveyor 22 to effect cooperative engagement with the pop-up conveyor 12 which includes a control system and variable speed conveyors. The slide sorter speed control conveyor 12 apparatus has three speeds including a feed belt slowing to either 100 or 200 from 300 feet per minute or to remain at 300 feet per minute prior to making a divert action. Different raising points create an "encoder pulse" for each speed and a slow down point "encoder pulse" from an induct eye.

The photo eye 104 just above the belt surface 20 detects anything within about 3/8 inch above the belt. The method of determining a maximum safe speed comprises or consists of the steps of calculating the item length measured with the photo eye if flat or a first contact point length measured with the photo eye. Thus the speed length is measured with the photo eye and the a hit point or raise point and a slowdown point is determined from the a lookup fable. A pop-up is timed to raise when the front of an item crosses the first lift rail of the pop-up conveyor 12. The pop-up slide sorter mechanism and speed sensing control system can be diverted without stopping the flow through conveyors 22, 24 and bringing the item to rest prior to diverting the item with the pop-up slide sorter 12. In addition, it is not necessary to bring the items to rest over the pop-up prior to it rising.

Figure 13:
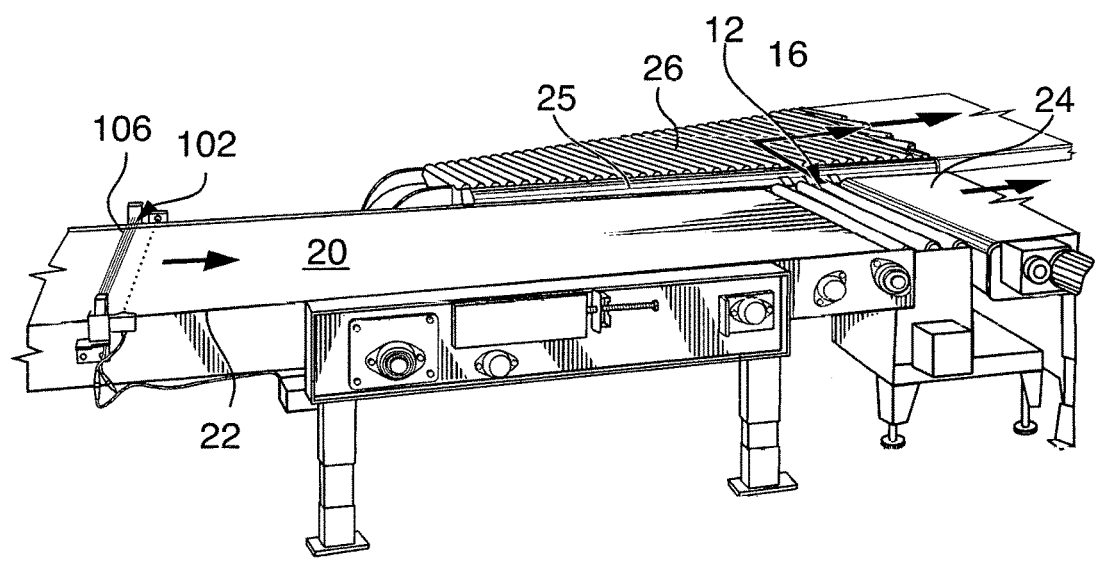
FIG. 13 is a flow through conveyor having an in-line pop-up slide sorter with a parallel takeaway configuration including a multiplexed light screen sensor and photocell sensor.

FIG. 13 shows the in-coming and out-going flow through conveyors, 22, 24 respectively, having an in-line pop-up slide sorter 12 paired with a take-off roll 25 and diverter or receiver conveyor 26. A parallel takeaway configuration including a multiplexed light screen sensor 102 is shown with photocell sensors 104 and 106.

Figure 14:
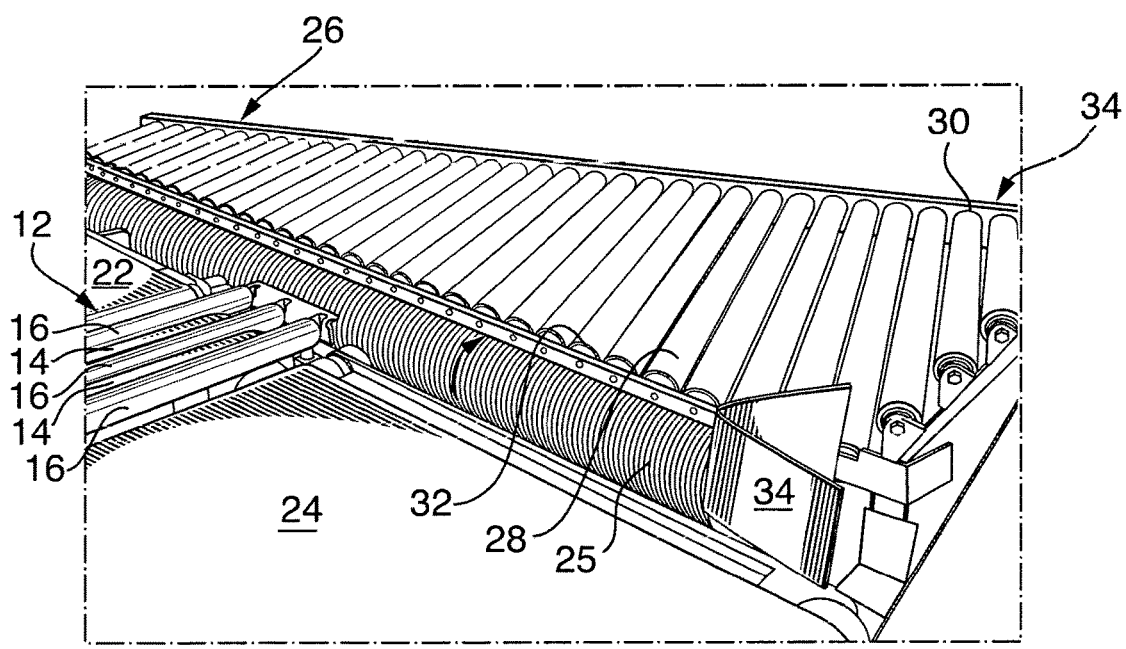
FIG. 14 is a perspective view of the in-coming and out-going flow through conveyors with a slide sorter pop-up transfer conveyor disposed therebetween, adjacent a take-off roller extending parallel to the flow through conveyor and normal to the slide sorter, with the diverter or receiver conveyor extending the length of the take off roller showing the diverter conveyor rollers disposed at a selected angle with the outside rollers rearward of the inside rollers adjacent the take-off roller creating forward and lateral motion toward the outside wall and the leading edge of the diverter conveyor disposed below the level of the take-off roller.
Figure 15:
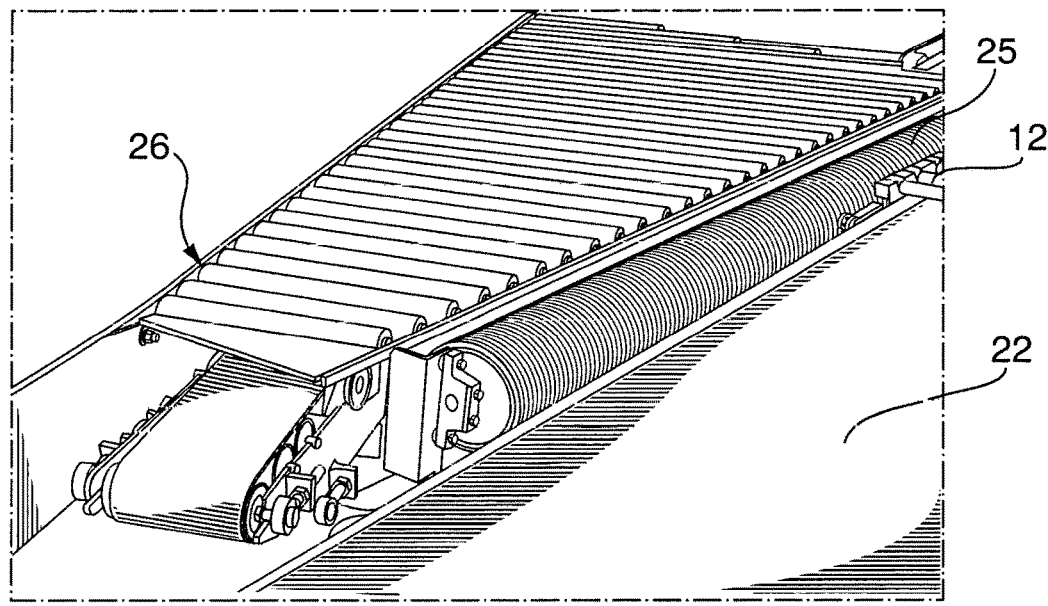
FIG. 15 is a downstream perspective view of the conveyor system shown in FIG. 14.
Figure 16:
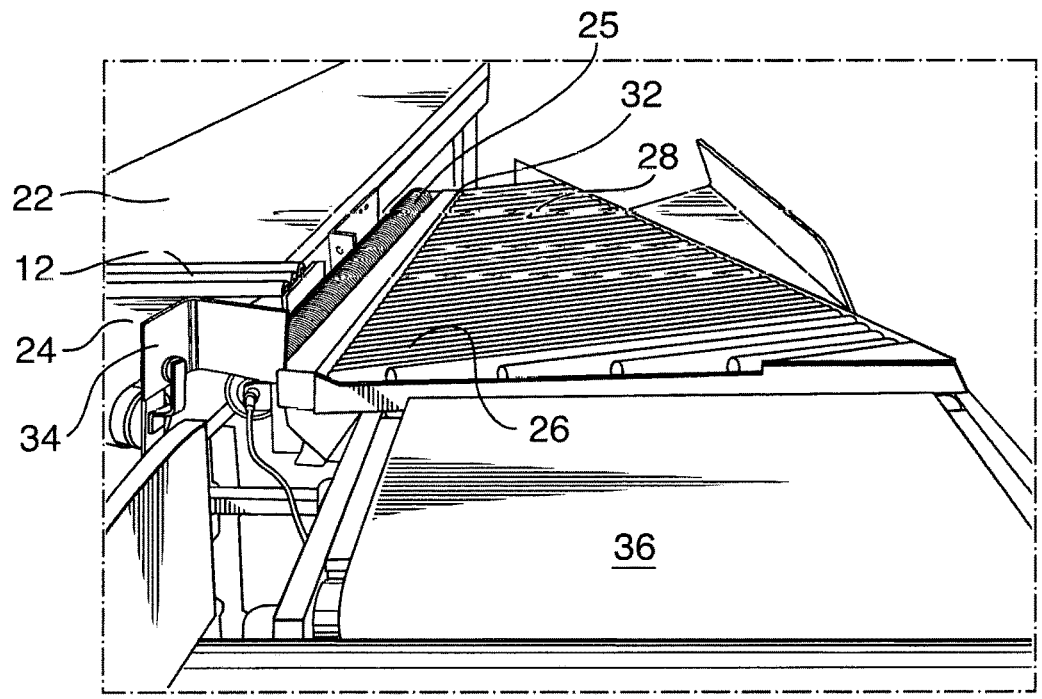
FIG. 16 is an upstream perspective view of the conveyor system shown in FIG. 14.

The embodiment shown in FIGS. 14-16 show a perspective view of the in-coming conveyor 22 and out-going flow through conveyor 24 with a slide sorter pop-up transfer conveyor 12 disposed therebetween in flow communication with a adjacent a take-off roller 25 extending parallel to the flow through conveyors 22, 24 and normal to the slide sorter 12, with the diverter 26 or receiver conveyor extending the length of the take off roller 25. The diverter conveyor 26 rollers 28 are disposed at a selected angle of up to 40 degrees and preferably between 20 and 25 degrees with the outward distal end 30 of the rollers 28 positioned rearward of the inner distal end 32 of the rollers 28 adjacent the take-off roller creating forward and lateral motion toward the outside wall 34 and leading edge of the diverter conveyor 26. An optional deflector 34 is mounted on the downstream end of the take-off roller 25 to deflect any items which have not cleared the flow through conveyor or are not in proper orientation for transfer via the diverting conveyor 26.

Figure 17:
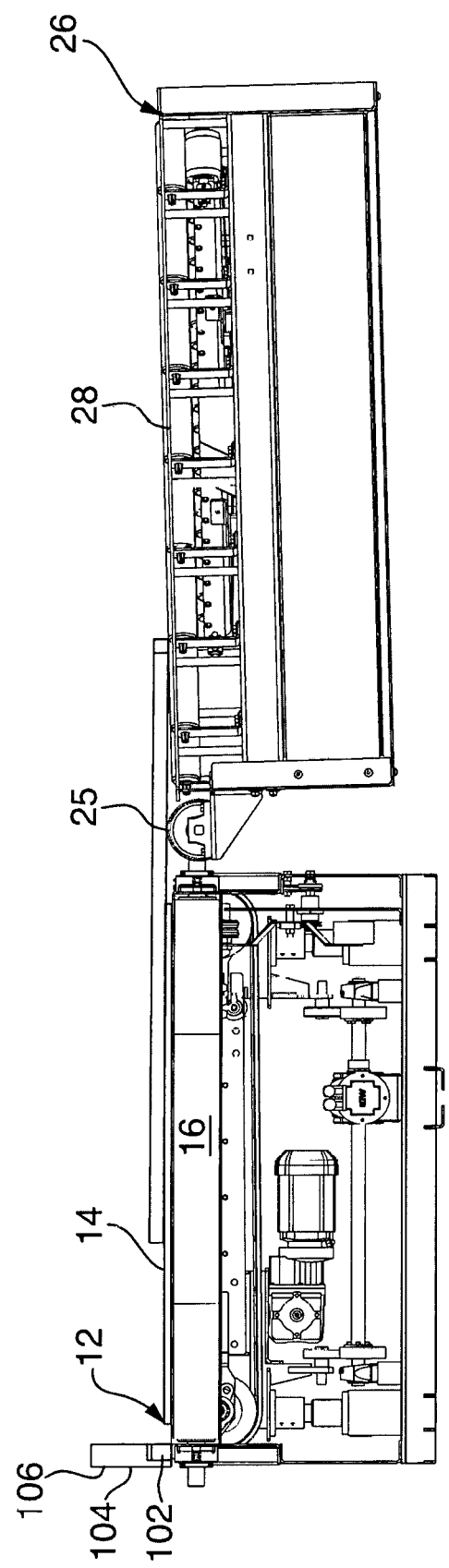
FIG. 17 is a sectional end view of the pop-up transfer conveyor speed control assembly showing the in-coming conveyor and the multiplexed light screen sensor and photocell or photo eye, and the longitudinal article resting on the belts of the pop-up transfer conveyor in the raised position partially rotated counter clockwise, and supported by the take-off roller and extending above a portion of the diverter or receiver conveyor, wherein the elevation of the pop-up belt is positioned above (about ⅜ inch) the in-coming and outgoing flow through conveyors and is positioned at the same elevation as the take-off roller (about ⅜ inch above the in-coming and outgoing flow through conveyor, and the rollers of the receiving or diverter conveyor are positioned about ⅛ inch below the elevation of the take-off roller and flow through conveyor with the receiving diverter conveyor tilted upward at a selected angle of from 1-35° with respect to the flow through conveyor so that articles come in contact with the receiving conveyor after extending over about 25% of the width of the receiving conveyor.

As best illustrated in FIG. 17, a sectional end view of the pop-up transfer conveyor speed control assembly shows the in-coming conveyor 22 and the multiplexed light screen sensor 102 and photocell or photo eyes 104 and 106. The longitudinal article resting on the belts 14 of the pop-up transfer conveyor 12 is shown in the raised position in a partially rotated counter clockwise orientation. It is supported by the take-off roller 25 and extends; above a portion of the diverter 26 or receiver conveyor, wherein the elevation of the pop-up belt 12 in the raised position is elevated above (about ⅜ inch) the in-coming conveyor 22 and outgoing flow through conveyor 24 and is positioned at the same elevation as the take-off roller 25 (about ⅜ inch above the in-coming and outgoing flow through conveyor). The proximate distal ends 32 of the rollers 28 of the receiving or diverter conveyor 26 are positioned about ⅛ inch below the elevation of the take-off roller 25 and flow through conveyor 22, 24 with the receiving diverter conveyor 26 tilted upward and outward at a selected angle of from 1-35° with respect to the flow through conveyor so that articles come in contact with the receiving conveyor 25 extending over about 25% of the width of the receiving conveyor 26 and are pulled into the center of the conveyor due to the forward and lateral forces of the offset rollers 28.

Figure 18:
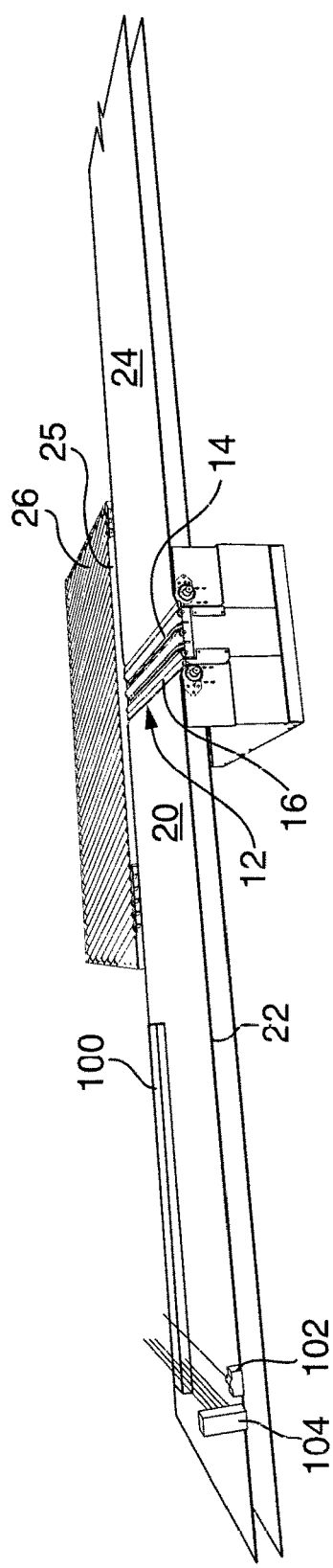
FIG. 18 is a perspective view of the pop-up transfer conveyor speed control assembly showing a longitudinal article resting on the in-coming conveyor and passing through the multiplexed light screen sensor and photocell or photo eye, the pop-up transfer conveyor in the down rest position, the take-off roller and the diverter or receiver conveyor, and the outgoing flow through conveyor.
Figure 19:
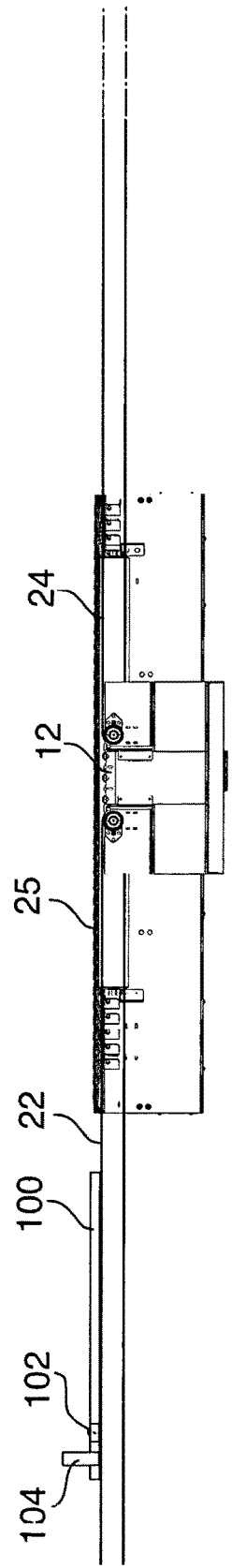
FIG. 19 is a side view of the pop-up transfer conveyor speed control assembly showing a longitudinal article resting on the in-coming conveyor and passing through the multiplexed light screen sensor and photocell or photo eye, the pop-up transfer conveyor in the down rest position, the take-off roller and the diverter or receiver conveyor, and the outgoing flow through conveyor.
Figure 22:
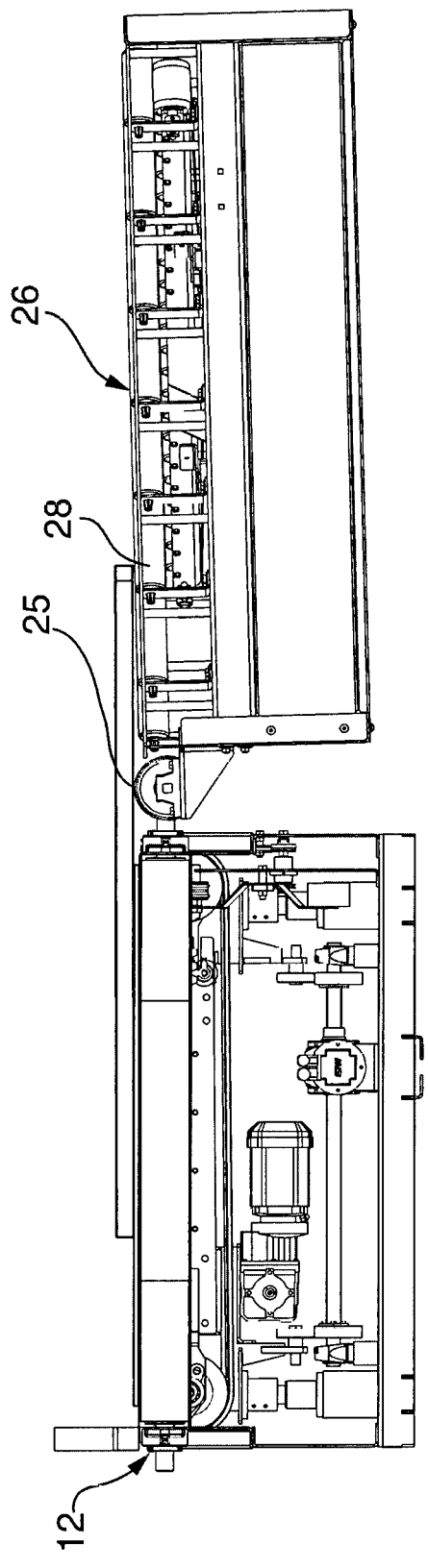
FIG. 22 is a sectional end view of the pop-up transfer conveyor speed control assembly showing the in-coming conveyor and the multiplexed light screen sensor and photocell or photo eye, and the longitudinal article resting on the belts of the pop-up transfer conveyor in the raised position partially rotated counter clockwise, and supported by the take-off roller and extending above a portion of the diverter or receiver conveyor, wherein the elevation of the pop-up belt is positioned above (about ⅜ inch) the in-coming and outgoing flow through conveyors and is positioned at the same elevation as the take-off roller (about ⅜ inch above the in-coming and outgoing flow through conveyor, and the rollers of the receiving or diverter conveyor are positioned about ⅛ inch below the elevation of the take-off roller and flow through conveyor with the receiving diverter conveyor tilted upward at a selected angle of from 1-35° with respect to the flow through conveyor so that articles come in contact with the receiving conveyor after extending over about 25% of the width of the receiving conveyor.
Figure 23:
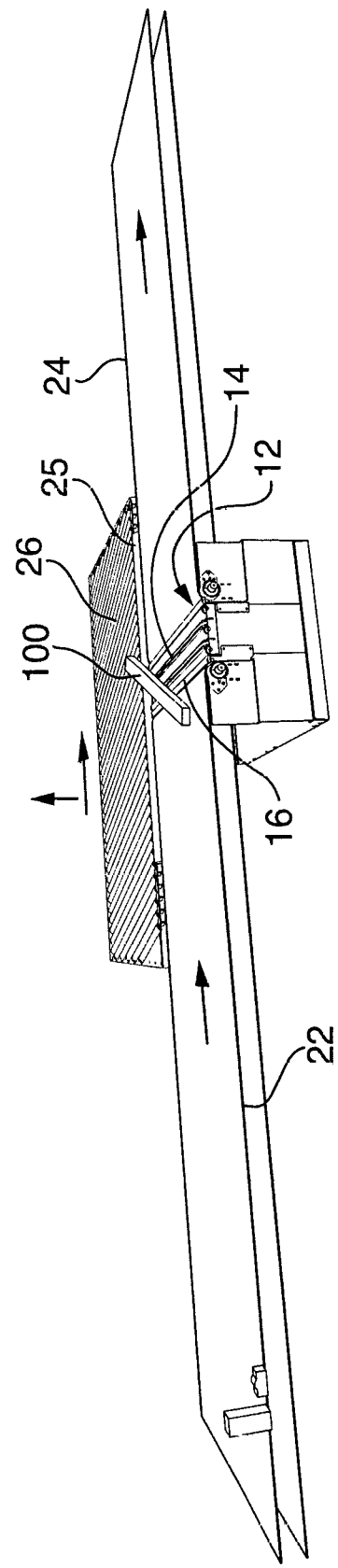
FIG. 23 is a perspective view of the pop-up transfer conveyor speed control assembly showing the in-coming conveyor and the multiplexed light screen sensor and photocell or photo eye, and the longitudinal article raised on the belts of the pop-up transfer conveyor in the up position supporting the front end portion of the longitudinal article above the in-coming flow through conveyor surface partially rotated and supported by the take-off roller above a portion (about 25% of the width) of the adjacent diverter or receiver conveyor having offset rollers angled away from the take-off roller and toward the outside wall of the receiving conveyor for moving the article forward and laterally toward the outside wall of the receiving conveyor and pulling the longitudinal article forward counter rotating the article "clockwise" with respect to the take-off roller.
Figure 24:
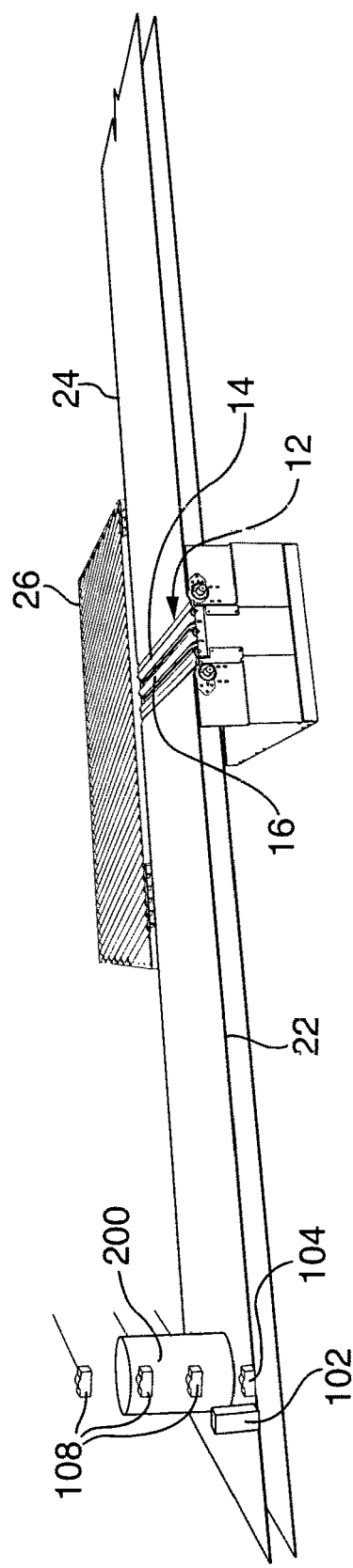
FIG. 24 is a perspective view of the pop-up transfer conveyor speed control assembly showing a tall cylindrical article such as a drum or bucket resting an end on the in-coming conveyor and passing through the multiplexed light screen sensor and photocell or photo eye in addition to an array of sensors is positioned to measure the height of the item, in addition to its length, with the pop-up transfer conveyor shown in the down resting position below the surface of the flow through conveyor, and showing the take-off roller and the diverter or receiver conveyor.
Figure 25:
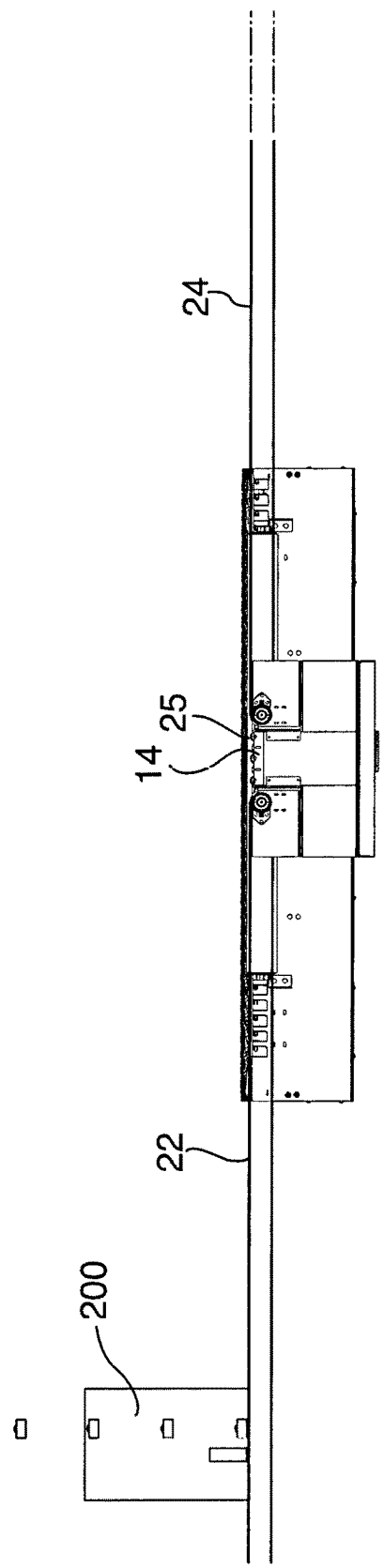
FIG. 25 is a side view of the pop-up transfer conveyor speed control assembly showing a drum resting on the in-coming flow through conveyor and passing through the multiplexed light screen sensor and photocell and array of height sensors with the pop-up transfer conveyor in the down rest position adjacent the take-off roller and the diverter or receiver conveyor.
Figure 26:
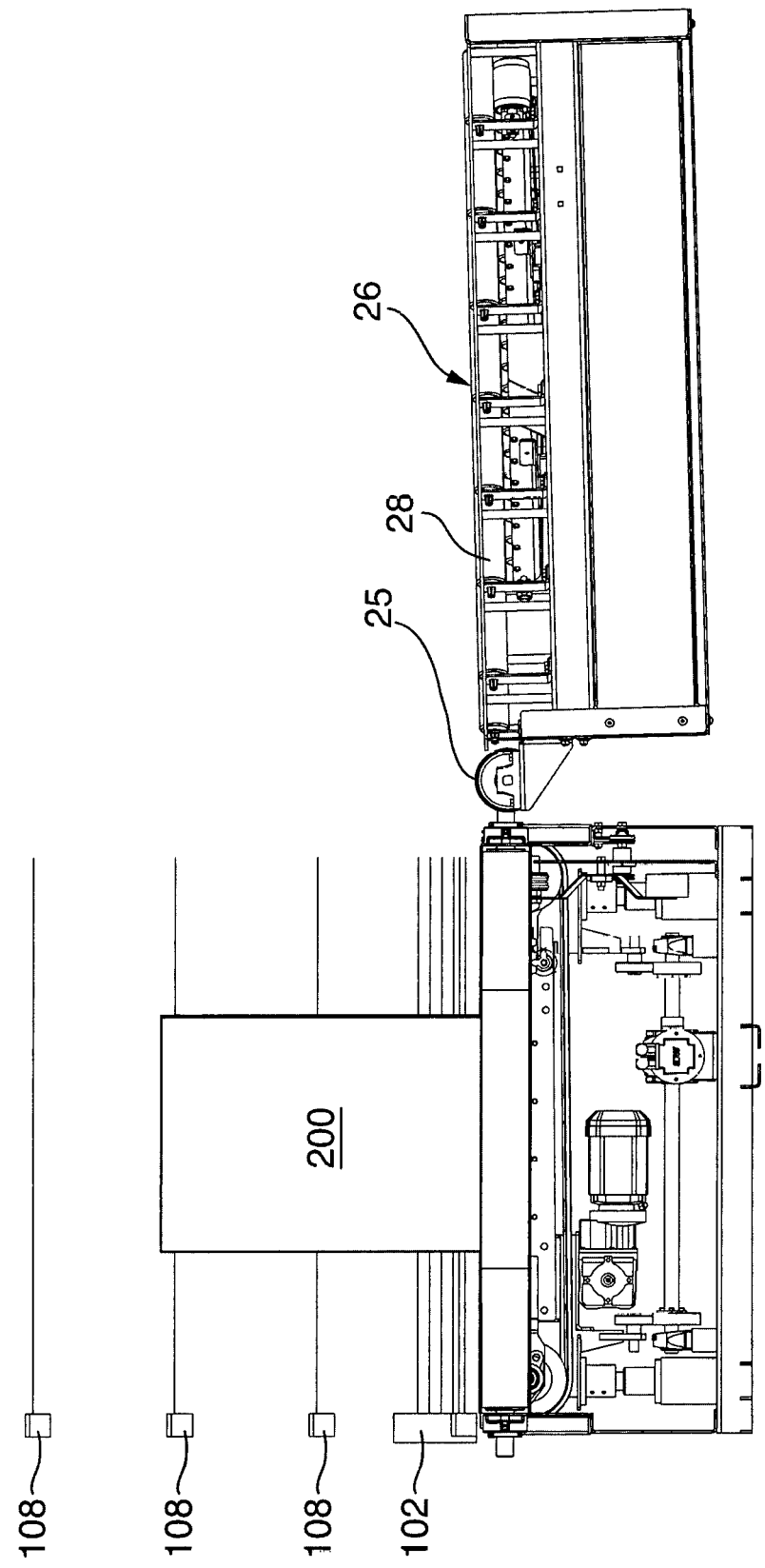
FIG. 26 is a sectional end view of the pop-up transfer conveyor speed control assembly showing a drum resting on the in-coming flow through conveyor and passing through the multiplexed light screen sensor and photo eye and the array of height sensors with the pop-up transfer conveyor in the down resting position adjacent the take-off roller and the receiver conveyor shown at an inclined angle of from 1 to 35°.
Figure 27:
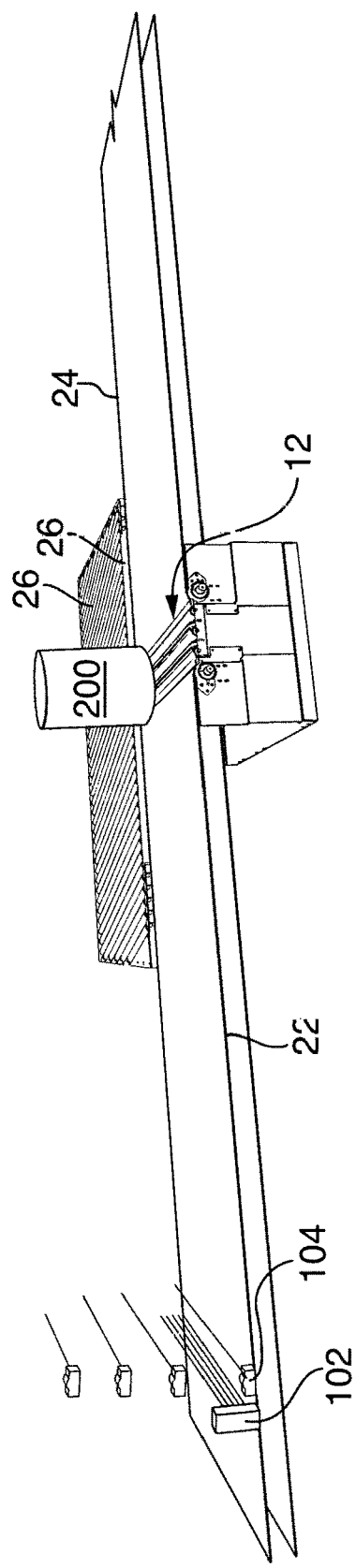
FIG. 27 is a perspective view of the pop-up transfer conveyor speed control assembly showing the in-coming conveyor and the multiplexed light screen sensor, photocell, and array of height sensors with the drum supported on the raised belts of the pop-up transfer conveyor above the in-coming and out-going flow through conveyor surface in the up raised position supporting the drum above the in-coming flow through conveyor surface and level with the take-off roller and level with a portion (about 25% of the width) of the adjacent receiver conveyor rollers.
Figure 28:
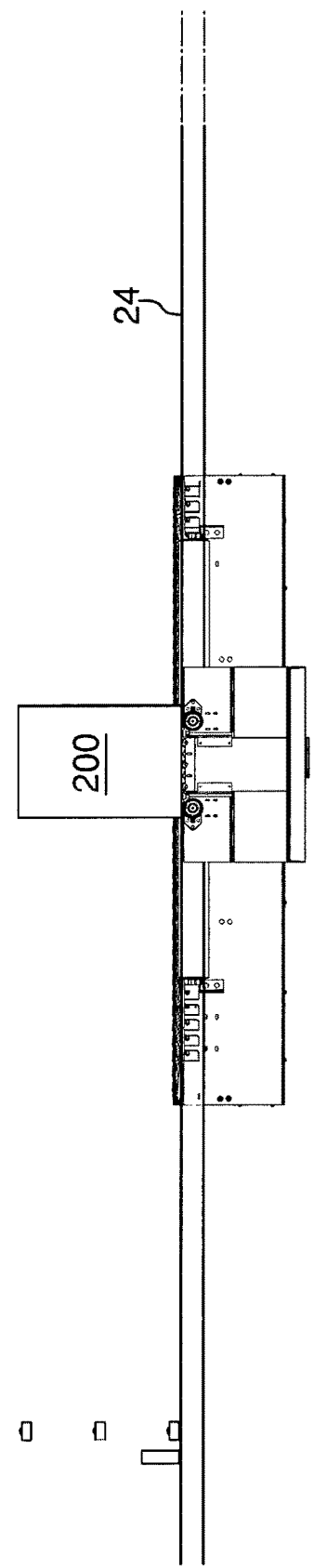
FIG. 28 is a side view of the pop-up transfer conveyor speed control assembly showing the in-coming conveyor and the multiplexed light screen sensor, photocells and array of height sensors and the drum supported on the belts of the pop-up transfer conveyor in the raised position.

The pop-up transfer conveyor speed control assembly shown in FIG. 18, have a longitudinal article 100 resting on the in-coming conveyor 22 and passing through the multiplexed light screen sensor 102 and photocell or photo eye 104, the pop-up transfer conveyor 12 in the down rest position, the take-off roller 25 and the diverter or receiver conveyor 26, and the outgoing flow through conveyor 24. FIG. 19 shows a pop-up transfer conveyor speed control assembly showing a longitudinal article 100 resting on the in-coming conveyor 22 and passing through the multiplexed light screen sensor 102 and photocell or photo eye 104. The pop-up transfer conveyor 12 is shown in the down rest position below the take-off roller 25 which extends above the edge of the diverter or receiver conveyor 26.

FIGS. 20-23 illustrate the pop-up transfer conveyor speed control assembly showing the in-coming conveyor 22 and the multiplexed light screen sensor 102 and photocell or photo eye 104, and the longitudinal article 100 resting on the belts 14 of the pop-up transfer conveyor 12 in the raised position partially rotated counter clockwise, and supported by the take-off roller 25 extending above a portion of the diverter or receiver conveyor 29, wherein the elevation of the pop-up belt 14 is also positioned above (about ⅜ inch) the in-coming and outgoing flow through conveyors 22 and 24 respectively, at the same elevation as the take-off roller 25. The proximate end of the rollers 28 of the receiving or diverter conveyor 26 are positioned a selected distance below the elevation of the take-off roller 25, for instance ⅛ inch. The conveyor rollers 28 of the diverter conveyor 26 are tilted upward and outward at a selected angle of from 1-35° with respect to the flow through conveyor 22, 24 so that articles extend over a portion (about 25%) of the receiving conveyor 26 before coming into contact with the rollers 28 in order to center the item 100 with respect to the conveyor rollers 28 and aid in rotation and orientation of longitudinal items 100.

Tall items 200 can tip over as the pop-up transfer belts 14 lift the article or parcel to transfer it from the in-coming flow through conveyor 22 to the diverter conveyor 26 if the flow through conveyor is running too fast. The pop-up speed control mechanism can utilize and additional photo eye array 108 for detecting the height of an article on the flow through conveyor 22 and controlling the speed prior to encountering the pop-up conveyor 12 to prevent the article from tipping over during the cross over to the diverter conveyor 26. The speed is adjusted in proportion to the length to height ratio of the article.

For example, an item that is 1.5 ft tall with a 3 ft base (3/1.5=ratio of 2) might be able to be handled at 300 fpm; an item that is 1.5 ft tall with a 2 ft base (2/1.5=ratio of 1.3) may only be safely handled without tipping at 200 fpm; and an item that is 1.5 ft tall with a 1 ft base (1/1.5=ratio of 0.7) may only be safely handled without tipping at 100 fpm. An array of sensors 108 is positioned to measure the height of the item, in addition to its length. The length to height can be determined via processor, and safe handling speed can be commanded to the conveyor drive to enable safe sorting, without tipping the item over.

FIGS. 24-29 show the pop-up transfer conveyor speed control assembly 10 conveying a tall cylindrical article such as a drum 200 resting on an end on the in-coming conveyor 22 and passing through the multiplexed light screen sensor 102 and photocell or photo eye 104, 106 in addition to an array of height sensors 108 positioned to measure the height of the item, in addition to its length. The pop-up transfer conveyor 12 is shown in the "down" resting position below the surface of the flow through conveyor 22, 24, and showing the take-off roller 25 and the diverter or receiver conveyor 26.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification's presented herein above.

We claim:
1. A slide sorter conveyor system, comprising:
an feed conveyor conveying a plurality of items downstream;
a downstream conveyor in flow communication with said feed conveyor for receiving said plurality of items;
a pop-up conveyor disposed between and in flow communication with said feed conveyor and said down- stream conveyor for conveying said plurality of items there between, said pop-up conveyor comprising:

a) a pass through surface for receiving and conveying and passing through a said plurality of items over said pop-up conveyor from said feed conveyor to said downstream conveyor;

b) said pop-up conveyor including a pop-up conveying surface resting at a selected distance below and transverse to said pass thorough surface when inactive;

c) said pop-up conveyor including means for raising said pop-up conveying surface a selected distance above said pass through surface for diverting said selected item from passing through to said downstream conveyor;

a control system including:

I) at least one light screen sensor for detecting a full length of said selected item or a length of a first portion of said selected item falling within close proximity to said pop-up conveying surface;

ii) at least one beam projecting sensor including a transmitter projecting at least a single beam a selected distance above a surface of said feed conveyor to a receiver for detecting a portion of said selected item resting on a surface of said feed conveyor engageable by said pop-up conveying surface;

iii) said control system controlling the rate of said feed conveyor for slowing without stopping said feed conveyor as for transferring said item to said pop-up conveyor;

iv) said control system actuating said means for raising said pop-up conveying surface for diverting said selected item to a diverting conveyor;

v) said control system including a variable speed control for controlling a conveying speed of said feed conveyor; and vi) said control system including a computer or a programmable logic control device in electrical communication with said variable speed control, said at least one light screen sensor, and said at least one beam projecting sensor providing data for said computer or programmable logic control device for calculating a full length and position of a selected item;

vii) said at least one length detecting sensor for detecting a full length of said selected item on said feed conveyor for controlling the rate of speed of said feed conveyor and actuating said pop-up conveying surface for a selected period of time upon said selected item coming within a selected proximity to said pop-up conveying surface and diverting said selected item from said downstream conveyor onto said diverting conveyor, said rate of speed of said feed conveyor selected as a function of a length of said selected item or a length of a first portion of said selected item falling within close proximity to said pop-up conveyor.

2. The slide sorter conveyor system for claim 1, wherein said means for detecting a physical characteristic of said plurality of items for separating and orienting said items comprises a photocell, an infrared sensor, a laser, a radiation sensor, an electronic device, a weight sensing device, and combinations thereof.

3. The slide sorter conveyor system of claim 1, wherein said pass through surface comprises a plurality of spaced apart conveyor rollers and a motor and drive means for rotating said conveyor rollers, wherein said at least one pop-up conveying surface is disposed between said spaced apart conveyor rollers and said at least one pop-up conveying surface is spaced apart from and in parallel alignment with said conveyor rollers.

4. The slide sorter conveyor system of claim 1, wherein said at least one of a pop-up conveying surface comprises at least one continuous belt, a plurality of continuous parallel belts, a plurality of rollers, at least one chain, and combinations thereof.

5. The slide sorter conveyor system of claim 1, wherein said means for raising said pop-up conveyor comprises a cam mechanism including a proximity sensor to detect a position of a cam.

6. The slide sorter conveyor system of claim 1, wherein said at least one beam projecting sensor comprises at least one photocell.

7. The slide sorter conveyor system of claim 1, wherein said at least one light screen sensor comprises at least one multiplex light screen sensor.

8. The slide sorter conveyor system of claim 1, wherein said feed conveyor changes the rate of speed prior to said selected item transfer to said pop-up conveyor without stopping.

9. The slide sorter conveyor system of claim 1, wherein said rate of speed of said feed conveyor is selected as a function of a length of said selected item or a length of a portion of said selected item.

10. The slide sorter conveyor system of claim 1, further including an array of height sensors in electrical communication with said control system for decreasing the rate of speed of said feed conveyor prior to transfer of said selected item having a selected height to said pop-up conveyor.

11. The slide sorter conveyor system of claim 10, wherein said rate of speed of said feed conveyor is adjusted in proportion based on a length to height ratio of said selected item.

12. The slide sorter conveyor system of claim 1, wherein said feed conveyor slows to a rate of speed of from 100 to 300 feet per minute prior to transfer of said selected item to said pop-up conveyor.

13. The slide sorter conveyor system of claim 1, including at least one diverter conveyor in flow communication with said pop-up conveyor.

14. The slide sorter conveyor system of claim 1, including a take-off roller adjacent and in flow communication with said pop-up conveyor.

15. The slide sorter conveyor system of claim 1, including a take-off roller disposed between and generally parallel to said feed conveyor.

16. The slide sorter conveyor system of claim 15, wherein said diverter conveyor extending adjacent to and at least a length of said take-off roller.

17. The slide sorter conveyor system of claim 16, wherein said diverter conveyor having a plurality of offset rollers for moving said selected item forward and laterally toward an outside wall of said diverter conveyor.

18. The slide sorter conveyor system of claim 15, wherein said take-off roller is positioned above said diverter conveyor a distance up to about 25% of a width of said diverter conveyor.

19. The slide sorter conveyor system of claim 15, wherein said diverter conveyer is positioned at an inclined angle extending up to 35 degrees from a side edge adjacent to said take-off roller to an outside edge thereof.

20. The slide sorter conveyor system of claim 1, wherein said pop-up conveyor is reversible.

21. The slide sorter conveyor apparatus of claim 1, wherein said pop-up conveying surface raises from about ½ to about ¾ of an inch above the pop-up conveyor rollers upon activation.

22. A slide sorter conveyor speed control apparatus, comprising:
an upstream conveyor conveying a first group of articles of a selected size, shape, irregular base, marking, or other characteristic and a second group of articles of a selected, different size, shape or characteristic;
a downstream conveyor in flow communication with said upstream conveyor conveying said first group of articles received therefrom;
a pop-up conveyor in flow communication with and disposed between said upstream conveyor and said downstream conveyor which passes through said first group of articles, said pop-up conveyor diverting and conveying said second group of articles in a direction away from said downstream conveyor;
said pop-up conveyor comprising:
a) a frame including a plurality of spaced apart parallel conveyor rollers disposed normal to and at about the same height as said upstream conveyor and said downstream conveyor for receiving and conveying and passing through said first group of articles from said upstream conveyor to said downstream conveyor, including a motor and drive means for rotating said conveyor rollers;
b) at least one pop-up belt disposed between said spaced apart conveyor rollers, said at least one pop-up belt spaced apart from and in parallel alignment with said conveyor rollers including a motor and drive means for rotating said at least one pop-up belt;
c) said at least one pop-up belt resting a selected distance below said conveyor rollers in an inactive position during conveying said first group of articles from said upstream conveyor passing over and through said conveyor rollers of said pop-up conveyor to said downstream conveyor;
d) said pop-up conveyor including cam means for raising said at least one pop-up belt a selected distance above said conveyor rollers conveying and diverting said second group of articles from said downstream conveyor;
at least one multiplex light screen sensor detecting a full length of said first group of articles and said second group of articles or a length of a first portion of said one of said second group of articles falling within close proximity to said pop-up conveying surface;
at least one beam projecting sensor including a transmitter projecting at least a single beam a selected distance over a surface of said upstream conveyor and a receiver for receiving said at least a single beam detecting portions of articles of said first group of articles resting on a surface of said upstream conveyor surface for detecting a portion of said one of said second group of articles resting on a surface of said upstream conveyor surface engageable by said at least one pop-up belt;
variable speed control means for controlling a conveying speed of said upstream conveyor;
computer control means in electrical communication with said variable speed control means and said pop-up conveyor motor and at least said upstream conveyor for controlling actuation of said at least one pop-up belt of said pop-up conveyor in response to data transmitted from said at least one multiplex light screen sensor and said at least one beam projecting sensor allowing said first group of articles to pass over said conveyor rollers and through said pop-up conveyor to said downstream conveyor, and activating said cam means raising said at least one pop-up belt diverting said second group of articles away from said downstream conveyor without stopping said upstream conveyor and said second downstream conveyor;
said computer receiving input from at least one multiplex light screen sensor and controlling the optimal speed of said upstream conveyor based upon said full length of one of said first group of articles or one of said second group of articles, or a length of a first portion of said first article or a length of a first portion of said one of said second group of articles conveyed within close proximity to said pop-up conveying surface for slowing said upstream conveyor and activating said pop-up conveyor raising said at least one belt of said pop-up conveyor to engage and divert said one of said second group of articles, said computer controlling a duration said at least one belt remains activated based on said full length of said one of said second group of articles;
said computer controlling said variable speed control means and the speed of said upstream conveyor for slowing said speed of said upstream conveyor prior to one of said second group of articles engaging said pop-up conveyor as a function of the length of said one of said second group of articles or the length of a first portion of one of said selected group of articles falls within a selected proximity to said pop-up conveyor for imparting a transverse force diverting said one of said second group of articles.

23. A slide sorter conveyor apparatus, comprising:
an upstream conveyor conveying at least one first article having a size, shape, irregular base, weight, height, marking, or other identifying characteristic and at least one second article having a size, shape, irregular base, weight, height, marking, or other identifying characteristic different from said first article;
a downstream conveyor for conveying said first article in flow communication with said upstream conveyor;
a pop-up conveyor disposed between and in flow communication with said upstream conveyor and said downstream conveyor, whereby said first article passes through said pop-up conveyor; and said pop-up conveyor diverts and conveys said second article away from said downstream conveyor;
said pop-up conveyor comprising:
a) a frame including a pass through surface for receiving and conveying and passing through said first article from said upstream conveyor to said downstream conveyor;
b) at least one pop-up conveying surface in perpendicular alignment with said pass through surface including a motor and drive means for rotating said at least one pop-up conveying surface;
c) said at least one pop-up conveying surface resting a selected distance below a top surface of said pass through surface in an inactive position during conveying said first article from said upstream conveyor passing over said pop-up conveyor to said downstream conveyor;
d) said pop-up conveyor including means for raising said at least one pop-up conveying surface a selected distance above said top surface of said pass through surface conveying and diverting said second article from said downstream conveyor;

at least one sensor detecting a full length of said first article and said second article or a length of a first portion of said first article and said second article falling within close proximity to said pop-up conveying surface;

means for detecting a full length or a length of a first portion of said first article or said second article falling within close proximity to said pop-up conveying surface within a selected proximity to said pop-up conveyor;

means for controlling a conveying speed of said upstream conveyor;

a computer in electrical communication with said control means and said pop-up conveyor motor for controlling actuation of said at least one pop-up conveying surface of said pop-up conveyor in response to data transmitted from said at least one sensor and said at least one beam projecting sensor for raising said at least one pop-up conveying surface diverting said second article away from said downstream conveyor without stopping said upstream conveyor and allowing said first article to pass over said conveyor rollers and through said pop-up conveyor to said downstream conveyor.

24. The slide sorter conveyor apparatus of claim 23, wherein said pass through surface comprises a plurality of spaced apart conveyor rollers and a motor and drive means for rotating said conveyor rollers, wherein said at least one pop-up conveying surface is disposed between said spaced apart conveyor rollers and said at least one pop-up conveying surface is spaced apart from and in parallel alignment with said conveyor rollers.

25. The slide sorter conveyor apparatus of claim 23, wherein said at least one sensor comprises at least one multiplex light screen sensor.

26. The slide sorter conveyor apparatus of claim 23, wherein said at least one beam projecting sensor comprises at least one photocell.

27. The slide sorter conveyor apparatus of claim 23, wherein said means for detecting a full length or a length of a first portion of said first article or said second article is selected from the group consisting of a weight sensing device, a photo cell, light transmitter, infrared radiation, pulsed infrared radiation, visible red light, a laser, and combinations thereof.

28. The slide sorter conveyor apparatus of claim 27, said means for detecting further including a distance of an article, an absence of an article, a presence of an article, a height of an article, an area of an article supported by said feed conveyor, a mark on an article, a size of an article, a shape of an article, a weight of an article, an identifying characteristic of an article, and combinations thereof.

29. The slide sorter conveyor apparatus of claim 23, wherein said computer comprises a programmable logic control device in electrical communication with said at least one multiplex light screen sensor, and said at least one beam projecting sensor for calculating a full length and position of said first article and said second article.

30. The slide sorter conveyor apparatus of claim 23, wherein including at least one transverse transfer conveyor in flow communication with said pop-up conveyor comprising at least one of a continuous belt, a plurality of continuous parallel belts, a plurality of rollers, at least one chain, and combinations thereof.

31. The slide sorter conveyor apparatus of claim 23, wherein said means for raising said pop-up conveyor comprises a cam mechanism including a proximity sensor to detect a position of a cam.

32. The slide sorter conveyor apparatus of claim 23, wherein said length detecting sensor comprises at least one multiplex light screen sensor.

33. The slide sorter conveyor apparatus of claim 23, including an array of height sensors in electrical communication with said programmable logic control device for decreasing the rate of speed of said feed conveyor prior to transfer of said selected item having a selected height to said pop-up conveyor.

34. The slide sorter conveyor apparatus of claim 23, wherein said
rate of speed of said feed conveyor is adjusted based on a length to height ratio of said second article.

35. The slide sorter conveyor apparatus of claim 23, wherein said upstream conveyor slows down to a rate of speed of between 100 to 300 feet per minute prior to transfer of said second article to said pop-up conveyor.

36. The slide sorter conveyor apparatus of claim 23, including at least one diverter conveyor in flow communication with said pop-up conveyor.

37. The slide sorter conveyor apparatus of claim 23, including a take-off roller adjacent to and in flow communication with said pop-up conveyor.

38. The slide sorter conveyor apparatus of claim 37, said diverter conveyor having a plurality of offset rollers for moving said selected item forward and laterally toward an outside wall of said diverter conveyor.

39. The slide sorter conveyor apparatus of claim 38, wherein said diverter conveyer is positioned at an inclined angle extending up to 35 degrees from a side edge adjacent to said take-off roller to an outside edge of said diverter conveyor.

40. The slide sorter conveyor apparatus of claim 23, wherein said pop-up conveyor is reversible.

41. A method of separating articles with a slide sorter conveyor apparatus, comprising the steps of:
conveying an article having a size, shape, irregular base, weight, height, marking, or other identifiable characteristic from an upstream conveyor to a downstream conveyor in longitudinal alignment therewith over a pop-up conveyor disposed between and in flow communication with said upstream conveyor and said downstream conveyor;

said pop-up conveyor having a pop-up conveying surface oriented in a transverse direction away from said downstream conveyor;

said pop-up conveyor comprising:
a) a frame including a plurality of spaced apart parallel conveyor rollers disposed normal to and at about the same height as said upstream conveyor and said downstream conveyor for receiving and conveying and passing through said first article from said upstream conveyor to said downstream conveyor, including a motor and drive means for rotating said conveyor rollers;
b) at least one pop-up belt disposed between said spaced apart conveyor rollers, said at least one pop-up belt spaced apart from and in parallel alignment with said conveyor rollers including a motor and drive means for rotating said at least one pop-up belt;
c) said at least one pop-up belt resting a selected distance below said conveyor rollers in an inactive position during conveying said article from said upstream conveyor passing over and through said conveyor rollers of said pop-up conveyor to said downstream conveyor;
d) said pop-up conveyor including means for raising said at least one pop-up belt a selected distance above said conveyor rollers conveying and diverting said article from said downstream conveyor;

detecting and selecting said article having at least one identifiable characteristic for removal with said pop-up conveyor;

detecting a full length of said article resting on a surface of said upstream conveyor surface with at least one length detecting sensor and detecting a portion of said article resting on a surface of said feed conveyor engageable by said pop-up conveying surface of at least one pop-up belt with at least one sensor having a single beam extending a selected distance over a surface of said upstream conveyor and a receiver for receiving said at least a single beam detecting portions of said article resting on a surface of said upstream conveyor;

controlling actuation of said at least one pop-up belt of said pop-up conveyor in response to data transmitted from said at least one sensing device and said at least one beam projecting device with a computer in electrical communication with said variable speed control means, said pop-up conveyor motor, and at least said upstream conveyor;

conveying said article to pass over said pop-up conveyor to said downstream conveyor;

activating said means raising said at least one pop-up belt diverting said article away from said downstream conveyor without stopping said upstream conveyor and said downstream conveyor;

controlling a duration said at least one pop-up belt remains activated based on said full length of said article to be diverted with said computer; and slowing said speed of said upstream conveyor with said computer prior to said article engaging said pop-up conveyor as a function of the length of said article or the length of a portion of said article falling within a selected proximity to said pop-up conveyor for imparting a transverse force diverting said article from said downstream conveyor.

42. The method of separating articles with a slide sorter conveyor apparatus of claim 41, including the step of adjusting the speed of said upstream conveyor prior to transfer of said article to said pop-up conveying surface according to a proportion of a length to a height ratio of said article to obtain a safe handling speed enabling safe sorting without tipping said article over.

43. The method of separating articles with a slide sorter conveyor apparatus of claim 41, wherein said sensor is selected from the group consisting of a photo cell, a weight sensing device, an electronic device, a light transmitter, an infrared radiation detecting device, pulsed infrared radiation detecting device, a visible red light detecting device, a laser, and combinations thereof.

* * * * *